(12) United States Patent
Ravi et al.

(10) Patent No.: US 11,762,061 B2
(45) Date of Patent: Sep. 19, 2023

(54) SYSTEM AND METHOD FOR FREE SPACE ESTIMATION

(71) Applicant: DEKA Products Limited Partnership, Manchester, NH (US)

(72) Inventors: Abhishek Ravi, Manchester, NH (US); Gregory J. Buitkus, Dracut, MA (US); Sai Ravi Teja Boggavarapu, Manchester, NH (US); Raajitha Gummadi, Manchester, NH (US); Derek Kane, Manchester, NH (US); Yu-Hsuan Chang, Manchester, NH (US)

( * ) Notice: Subject to any disclaimer, the term of this patent is extended or adjusted under 35 U.S.C. 154(b) by 526 days.

(21) Appl. No.: 16/938,786

(22) Filed: Jul. 24, 2020

(65) Prior Publication Data

US 2021/0026361 A1    Jan. 28, 2021

Related U.S. Application Data

(60) Provisional application No. 62/879,391, filed on Jul. 26, 2019.

(51) Int. Cl.
*G06V 20/58* (2022.01)
*G06F 17/11* (2006.01)
*G01S 7/48* (2006.01)
*G06F 16/33* (2019.01)

(52) U.S. Cl.
CPC ........ *G01S 7/4808* (2013.01); *G06F 16/3346* (2019.01); *G06F 17/11* (2013.01); *G06V 20/58* (2022.01)

(58) Field of Classification Search
CPC .... G01S 7/4808; G01S 17/931; G01S 17/894; G06F 16/3346; G06F 16/334; G06F 16/3331; G06F 16/33; G06F 16/30; G06F 16/00; G06F 17/11; G06F 17/10; G06F 17/00; G06V 20/58; G06V 10/44; G05D 1/0214; G05D 1/0257; B60W 40/02; B60W 60/0016; B60W 2420/52; B60W 2552/50

See application file for complete search history.

(56) References Cited

U.S. PATENT DOCUMENTS

| | | | |
|---|---|---|---|
| 9,495,874 B1 * | 11/2016 | Zhu | G06N 20/00 |
| 11,022,693 B1 * | 6/2021 | Allais | G05D 1/0088 |
| 2017/0123428 A1 * | 5/2017 | Levinson | G05D 1/0257 |

OTHER PUBLICATIONS

Borgmann et al., Usage of Multiple LIDAR Sensors on a Mobile System for the Detection of Persons with Implicit Shape Models, The International Archives of the Photogrammetry, Remote Sensing and Spatial Information Sciences, vol. XLII-2, ISPRS TC II Midterm Symposium "Towards Photogrammetry 2020", Jun. 4-7, 2018, 7 pages.

(Continued)

*Primary Examiner* — Mohamed Charioui
(74) *Attorney, Agent, or Firm* — William A. Bonk, III

(57) ABSTRACT

A system and method for estimating free space and assigning free space probabilities in point cloud data associated with an autonomous vehicle traveling on a surface, including taking into account sensor noise, sensor availability, obstacle heights, and distance of obstacles from the sensor. System and method can include determining surface planes and classifying point cloud points according to whether or not the points fall on surface planes, among other factors.

19 Claims, 27 Drawing Sheets

(56) References Cited

OTHER PUBLICATIONS

Chen et al., Transforming a 3-D LiDAR Point Cloud Into a 2-D Dense Depth Map Through a Parameter Self-Adaptive Framework, IEEE Transactions of Intelligent Transportation Systems, 2016, 12 pages.

Choy et al., Enriching Object Detection with 2D-3D Registration and Continuous Viewpoint Estimation, 2015 IEEE Conference on Computer Vision and Pattern Recognition (CVPR), 2015, pp. 2512-2520, doi: 10.1109/CVPR.2015.7298866.

Communication dated Mar. 9, 2022, issued in European Patent Application No. 20757045.8, 3 pages.

De Silva et al., Robust Fusion of LiDAR and Wide-Angle Camera Data for Autonomous Mobile Robots, Institute for Digital Technologies, Loughborough University, Aug. 15, 2018, 21 pages.

Harakeh, Towards Fully Self-Supervised Free Space Estimation For Unmanned Ground Vehicles, American University of Beirut, Apr. 2016, 58 pages.

Harms et al., Grid Map based Free Space Estimation using Stereo Vision, Karlsruhe Institute of Technology, 1st Workshop on Environment Perception for Automated On-road Vehicles, IEEE Intelligent Vehicles Symposium, 2015, 2 pages.

He et al., A Novel Way to Organize 3D LiDAR Point Cloud as 2D Depth Map Height Map and Surface Normal Map, 2015 IEEE International Conference on Robotics and Biomimetics (ROBIO), 2015, pp. 1383-1388, doi: 10.1109/ROBIO.2015.7418964., 6 pages.

Huang et al., A Practical Point Cloud Based Road Curb Detection Method for Autonomous Vehicle, MDPI information, Jul. 30, 2017, 24 pages.

International Preliminary Report on Patentability dated Feb. 10, 2022, issued in PCT Patent Application No. PCT/US2020/043601, 10 pages.

International Search Report and Written Opinion dated Nov. 18, 2020, issued in PCT Patent Application No. PCT/US2020/043601, 10 pages.

Kim et al., Design and Implementation of Ground Plane Detection using Predefined Datasets and Space Geometric Analysis, Journal of Semiconductor Technology and Science, vol. 18, No. 4, Aug. 2018, 9 pages.

Kocić et al., Sensor Fusion in Autonomous Vehicles, ResearchGate, Nov. 2018, 5 pages.

Li et al., Light-Head R-CNN: In Defense of Two-Stage Object Detector, Cornell University, arXiv:1711.07264 [cs.CV], Nov. 23, 2017, 9 pages.

Liu et al., SSD: Single Shot MultiBox Detector, Cornell University, arXiv:1512.02325v5 [cs.CV], Dec. 29, 2016, 17 pages.

OpenCV—Open Source Computer Vision, Camera calibration With OpenCV, Mar. 29, 2019, 16 pages.

Park et al., Calibration between Color Camera and 3D LIDAR Instruments with a Polygonal Planar Board, Sensors, 2014, 14, pp. 5333-5353.

Pendleton et al., Perception, Planning, Control, and Coordination for Autonomous Vehicles, Machines 2017 5,6, Feb. 17, 2017, 54 pages.

Rodríguez-Cuenca et al., Morphological Operations to Extract Urban Curbs in 3D MLS Point Clouds, ISPRS Int. International Journal of Geo-Information, Jun. 14, 2016, 17 pages.

Ronneberger et al, U-Net: Convolutional Networks for Biomedical Image Segmentation, Cornell University, arXiv:1505.04597v1 [cs.CV], May 18, 2015, 8 pages.

ROS.org, How to Calibrate a Monocular Camera, Open Source Robotics Foundation, Apr. 20, 2017, 8 pages.

Sahdev et al., Free Space Estimation using Occupancy Grids and Dynamic Object Detection, Department of Computer Science, University of Toronto., arXiv:1708.04989v1 [cs.CV], Aug. 16, 2017, 10 pages.

Soquet et al., Free Space Estimation for Autonomous Navigation, 5th International Conference on Computer Vision Systems, 2007, Bielefeld, Germany. 2007, 11 pages.

THOMA—A Survey of Semantic Segmentation, Cornell University, arXiv:1602.06541v2 [cs.CV], May 11, 2016, 16 pages.

Velas et al., Calibration of RGB Camera Velodyne LiDAR, WSCG2014 Conference on Computer Graphics, Visualization and Computer Vision Communication Papers Proceedings, 2014, 10 pages.

Velodyne LiDAR, VLP-32C User Manual, 63-9325 Rev. B, 2018, 136 pages.

Wang, Semantic Segmentation, Machine Learning Group, University of Toronto, date unknown, 28 pages.

Xiao et al., Gaussian process regression-based robust free space detection for autonomous vehicle by 3-D point cloud and 2-D appearance information fusion, International Journal of Advanced Robotic Systems, Jul.-Aug. 2017, 20 pages.

Yao et al., Estimating Drivable Collision-Free Space from Monocular Video, Mitsubishi Electric Research Laboratories https://www.merl.com Jan. 6, 2015, 10 pages.

\* cited by examiner

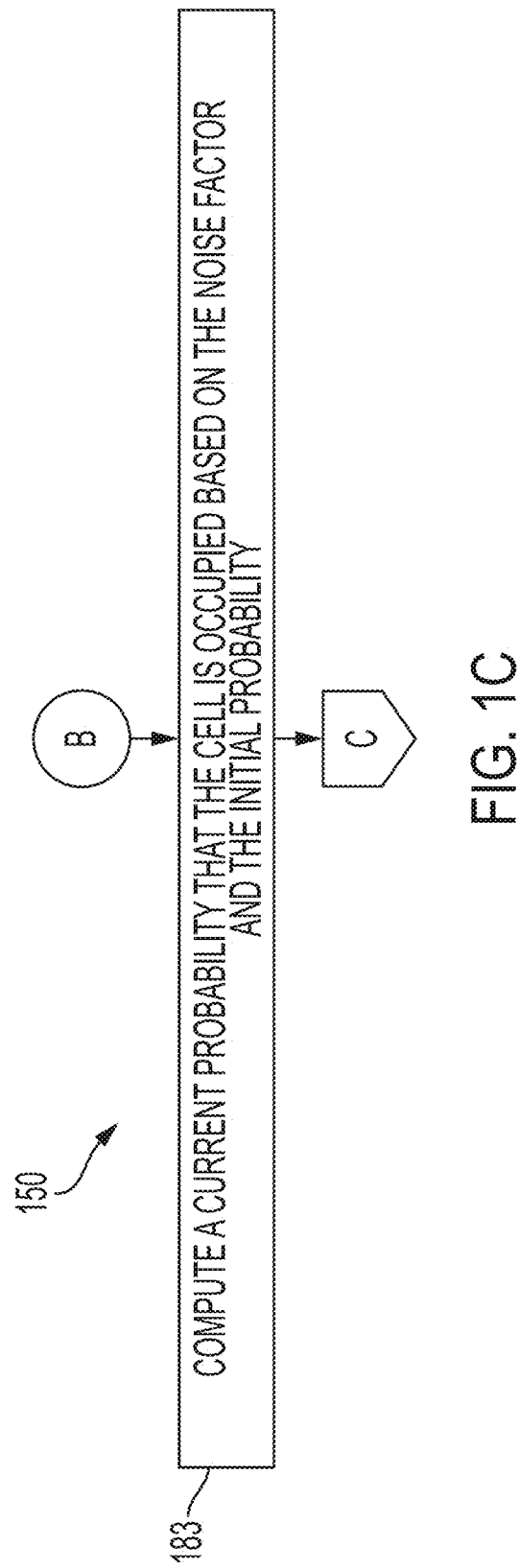

SYSTEM AND METHOD FOR FREE SPACE ESTIMATION

CROSS REFERENCE TO RELATED APPLICATIONS

This utility patent application claims the benefit of U.S. Provisional Patent Application Ser. No. 62/879,391 filed Jul. 26, 2019, entitled System and Method for Free Space Estimation, which is incorporated herein by reference in its entirety.

BACKGROUND

Vehicles travel on surfaces that are determined by their human operators to include free, unobstructed space. Humans use a complicated set of criteria to determine whether or not to traverse a path in or on a vehicle. Considerations can include how high an obstacle is, how much of the obstacle can be seen by the human, areas around the vehicle that the human cannot visualize, and how accurate the human's visioning system is at detecting obstructions given any number of factors such as, but not limited to, ambient lighting, weather, and windshield issues.

Navigating obstructions in an autonomous vehicle can require evaluating electronically some of the same complicated criteria routinely encountered by a human vehicle operator. Unobstructed (free) space must be quickly determined from available sensor data for the autonomous vehicle to continuously proceed along a navigation path. Previously, free space has been estimated from stereo camera data, from a sequence of images in a video acquired by a camera system, and from millimeter wave radar data, among other ways.

What is needed is an efficient system that computes, from sensor data, the probability that the path is obstructed. The sensor collecting the sensor data can be mounted upon the autonomous vehicle, for example. What is needed is a system that takes into account the realities of road travel and sensor limitations.

SUMMARY

The system and method of the present teachings for assigning free space probabilities in point cloud data associated with an autonomous vehicle traveling on a surface includes taking into account sensor noise, sensor availability, obstacle heights, and distance of obstacles from the sensor. The method of the present teachings can include, but is not limited to including, receiving the point cloud data from a sensor. The sensor can include a sensor beam, and the sensor beam can project at least from the sensor to the surface. In some configurations, the sensor can scan the area surrounding the autonomous vehicle, collecting data in a cone from the surface spanning a pre-selected angle. The method can include segmenting the point cloud data into segments of a first pre-selected size, and locating planes, plane points in the planes, and non-plane points associated with at least one of the plane points within the point cloud data. The method can include determining normals to the plane points and determining the non-plane points associated with the plane points. The method can include choosing at least one of the planes as a surface plane according to pre-selected criteria based at least on the normals and the location of the sensor, classifying each of the plane points as an obstacle point based at least on the associated non-plane points, and determining obstacle height associated with the obstacle points based at least on the non-plane points. The method can include creating a grid from the surface planes. The grid can include a pre-selected number of cells and a perimeter. The method can include computing a measurement significance for each of the cells based at least on the obstacle heights in the cells, and determining a blind distance from the sensor based at least on an intersection between the sensor beam and the surface plane. For each cell along each line between the blind distance and the perimeter, the method can include computing an initial probability of obstacles occupying the cell along the line. The initial probability can be based at least on availability of the sensor, the obstacle points in the cell, and a position of the cell along the line with respect to the sensor. For each cell along each line between the blind distance and the perimeter, the method can include computing a noise factor based at least on a first distance between the sensor and a closest of the obstacles along the line in the cell, a second distance between the sensor and the cell along the line, the measurement significance for the cell along the line, the initial probability for the cell along the line, and a default probability. For each cell along each line between the blind distance and the perimeter, the method can include computing a current probability of the obstacles occupying the cell along the line. The current probability can be based at least on the initial probability for the cell and the noise factor for the cell.

The first pre-selected size can optionally include a shape about the size of 40 m×40 m×2 m. The pre-selected criteria can optionally include choosing the surface plane when the normals of the at least one plane do not face the sensor. The pre-selected number of cells can optionally include 400× 400. Computing the initial probability can optionally include (a) if the sensor is unavailable and the cell is a near cell, the near cell being near the blind distance, the initial probability of the cell can optionally equal 1.0, (b) if the sensor is unavailable and the cell is between the near cell and the perimeter, the initial probability of the cell can optionally equal 0.5, (c) if the sensor is available and there is at least one of the obstacle points in the cell, or if one of the cells along the line that was previously encountered included at least one of the obstacle points, the initial probability of the cell can optionally equal 0.5, and (d) if the sensor is available and there are none of the obstacle points in the cell and none of the cells previously encountered along the line included at least one of the obstacle points, the initial probability of the cell can optionally equal 0.3. The noise factor can optionally equal ((measurement significance/($\sigma \sqrt{2\pi}$))+0.5−the initial probability of the cell)*exp(−0.5*((d−$Z_t$)/$\sigma$)$^2$), where d=the second distance, $Z_t$=the first distance, and $\sigma = Z_t^2 * 0.001$. Computing the current probability can optionally equal the sum of the noise factor of the cell and the initial probability of the cell. The at least one plane can optionally include the non-plane points up to a first pre-selected distance from the at least one plane. The first pre-selected distance can optionally include 2 m.

The system of the present teachings for assigning free space probabilities from point cloud data can include, but is not limited to including, a sensor having a sensor beam. The sensor beam can project at least from the sensor to the surface. The system can include a segment processor receiving the point cloud data from the sensor. The segment processor segmenting the point cloud data into segments of a first pre-selected size. The system can include a plane processor locating, within the point cloud data, planes, plane points in the planes, and non-plane points associated with at least one of the plane points. The system can include a normals processor determining normals to plane points and determining the non-plane points associated with the plane points. The normal processor can choose at least one of the planes as a surface plane according to pre-selected criteria based at least on the normals and the location of the sensor. The normals processor can classify each of the plane points as an obstacle point based at least on the associated non-plane points. The normals processor can determine obstacle height associated with the obstacle points based at least on the non-plane points. The system can include a grid processor creating a grid from the surface planes. The grid can include a pre-selected number of cells and a perimeter. The system can include a line sweep processor that can include a measurement significance processor. The measurement significance processor can compute a measurement significance for each of the cells based at least on the obstacle heights in the cells, The line sweep processor can include an initial probabilities processor determining a blind distance from the sensor based at least on an intersection between the sensor beam and the surface plane. For each cell along each line between the blind distance and the perimeter, the initial probabilities processor can include computing an initial probability of obstacles occupying the cell along the line. The initial probability can be based at least on the availability of the sensor, the obstacle points in the cell, and a position of the cell along the line with respect to the sensor. The line sweep processor can include a noise factor processor. For each cell along each line between the blind distance and the perimeter, the noise factor processor can compute a noise factor based at least on a first distance between the sensor and a closest of the obstacles along the line in the cell, a second distance between the sensor and the cell along the line, the measurement significance for the cell along the line, the initial probability for the cell along the line, and a default probability. The line sweep processor can include a current probabilities processor. For each cell along each line between the blind distance and the perimeter, the current probabilities processor can compute a current probability of the obstacle points occupying the cell along the line. The current probability can be based at least on the initial probability for the cell and the noise factor for the cell.

In some configurations, the method for assigning free space probabilities in sensor data for an autonomous vehicle can include, but is not limited to including, determining at least one surface plane in the sensor data, where the at least one surface plane can be associated with a surface where the autonomous vehicle is traveling. The method can include determining obstacles, if any, and heights of the obstacles, if any, in the sensor data associated with the at least one surface plane, and determining a blind distance from the autonomous vehicle based at least on a dimension of the autonomous vehicle. The method can include creating a grid on the at least one surface plane, where the grid can include a pre-selected number of cells and a perimeter. For each cell along each line on the at least one surface plane between the blind distance and the perimeter, the method can include computing an initial probability of the obstacles occupying the cell along the line. The initial probability can be based at least on availability of the sensor data, the obstacles in the cell, and a position of the cell along the line with respect to the autonomous vehicle. For each cell along each line between the blind distance and the perimeter, the method can include computing a noise factor based at least on a first distance between the autonomous vehicle and a closest of the obstacles along the line in the cell, a second distance between the autonomous vehicle and the cell along the line, the obstacle heights for the cell along the line, the initial probability for the cell along the line, and a default probability. For each cell along each line between the blind distance and the perimeter, the method can include computing a current probability of the obstacles occupying the cell along the line, the current probability being based at least on the initial probability for the cell and the noise factor for the cell.

The pre-selected number of cells can optionally include 400×400. Computing the initial probability can optionally include (a) if the sensor data are unavailable and the cell is a near cell, the near cell being near the blind distance, the initial probability of the cell can optionally equal 1.0, (b) if the sensor data are unavailable and the cell is between the near cell and the perimeter, the initial probability of the cell can optionally equal 0.5, (c) if the sensor data are available and there is at least one of the obstacles in the cell, or if one of the cells along the line that was previously encountered included at least one of the obstacles, the initial probability of the cell can optionally equal 0.5, and (d) if the sensor data are available and there are none of the obstacles in the cell and none of the cells previously encountered along the line included at least one of obstacles, the initial probability of the cell can optionally equal 0.3. Computing the noise factor can optionally equal $((0.09*28.2*\Sigma$ the obstacle heights in the cell/$(\sigma\sqrt{2\pi}))+0.5-$the initial probability of the cell)*exp$(-0.5*((d-Z_t)/\sigma)^2)$, wherein d=the second distance, $Z_t$=the first distance, and $\sigma=Z_t^2*0.001$. Computing the current probability can optionally equal the sum of the noise factor of the cell and the initial probability of the cell. The at least one surface plane can optionally include non-plane points up to a first pre-selected distance from the at least one surface plane. The first pre-selected distance can optionally include 2 m. The method can optionally include determining the obstacle heights based at least on the non-plane points.

In another configuration, free space estimation from LIDAR data, where the LIDAR data includes rings, can include, but is not limited to including, receiving LIDAR data, and filtering a pre-selected number of points in each ring. Filtering can include identifying a median value in each pre-selected number of points and retaining points that are within a pre-selected range from the median. Among the retained points can be discontinuities in which the Cartesian distance between the points is greater than a pre-selected value. Points that are between the discontinuities are labeled as good points if they have passed the median filter. Good points can be expected to have low sensor noise. Where the number of good points between discontinuities is greater than a pre-selected value, then those good points are retained. Discontinuities, or break points, can be found at the edges of features, so that when there is a sudden change in the distance between points, an edge could be found.

At this point, each of the filtered points can be associated with a LIDAR ring. The filtered point data can be divided sections of 64 points each. A random section is selected, and two points from the random section can be chosen. The two points can be intelligently chosen based on how the points were labeled in the filtering process, i.e. good points and break points. For example, two points between the same two discontinuities can be chosen. A third point is chosen from an adjacent ring, and a plane is formed from the three points. The plane is evaluated with respect to certain pre-selected criteria according to an algorithm that can eliminate planes that are not significant, or are not interesting. All points on the adjacent LIDAR ring (the LIDAR ring corresponding to third point) that are within the azimuth range of first two points are evaluated as candidates to be included in the first growth stage. The plane equation is calculated with the updated set of points. Then the points are evaluated again to grow this plane along the points data structure axes that correspond to LIDAR rings and azimuth angles respectively. At each growth stage, the orientation and residual error of the plane are checked. Residual error is calculated as a plane is fitted to a set of points, and orientation is the angle check between the gravity vector and the normal vector of the plane. Growth on each side is done until the residual error for the new set of points along a direction, for example, growing towards an outward ring would check the residual error of the new set of points being added from that ring, is above the threshold set, or until the edge of the point cloud is reached. When growing stops, the orientation and residual error are checked again, and the planes are classified as either valid (orientation angle with respect to the gravity vector and residual error within a pre-selected threshold range) or invalid. If valid, in some configurations, the plane can be assigned a score. Additional checks are completed to filter the planes further. For example, the number of times the process outline herein occurs can be compared to a desired maximum that can be configured. The planes can be tested against ground plane criteria according to, for example, but not limited to, a scoring algorithm that can be used to assess the quality of the planes.

The final set of planes is used to compare LIDAR data against to determine if the LIDAR data represent ground data or obstacle data. The planes are transformed to the frame of reference of the autonomous vehicle, referred to herein as the baselink frame, and a new plane equation is created. The optimum situation is if there is a plane in all directions, i.e. in front of the autonomous vehicle, behind the autonomous vehicle, to the left of the autonomous vehicle and to the right of the autonomous vehicle. If any plane is missing, a plane from a previous time when synchronized LIDAR data and corresponding ground planes were received may be used until the plane becomes stale. If a plane is stale, then no points are fitted in the direction of the stale plane. If there is no plane in any direction, a default X/Y plane can be used. In some configurations, if a plane has not been detected for a period of seven iterations, a default plane in which z+d=0 can be used.

Now that the ground planes are ready for comparison, the LIDAR points that don't fall within a pre-selected boundary, or that are above a certain height, are filtered from the LIDAR data. The remaining points are transformed to the autonomous vehicle frame of reference, and points that are located in the blind spot of the LIDAR are filtered out. The transformed points are classified according to whether or not they are within one of the previously-determined ground planes. If the points fall on the ground planes, they are marked as free space, otherwise, classified as an obstacle. The points are located on a grid map. If there is already an obstacle at that location, the heights of the obstacles are added together and the number of obstacles at the location is incremented. For each location on the grid map, the probability of occupancy for each cell in the grid map depends upon distance of the cell to the sensor, LIDAR noise, measurement significance, whether the cell is on an obstacle, the presence of a measurement, free space and if the LIDAR is blocked. The probability of occupancy as computed herein follows a Gaussian probability. Logodds of the location's being occupied is computed over the probability of occupancy. The logodds increases when the obstacle is closer to the autonomous vehicle and decreases as the obstacle is farther away from the autonomous vehicle. Beyond the LIDAR range, the logodds are marked as infinite.

BRIEF DESCRIPTION OF THE DRAWINGS

The present teachings will be more readily understood by reference to the following description, taken with the accompanying drawings, in which:

FIGS. 1A-1C are flowcharts of the process of the present teachings;

DETAILED DESCRIPTION

The system and method of the present teachings can estimate the free space surrounding an autonomous vehicle in real time.

Figure 1A:
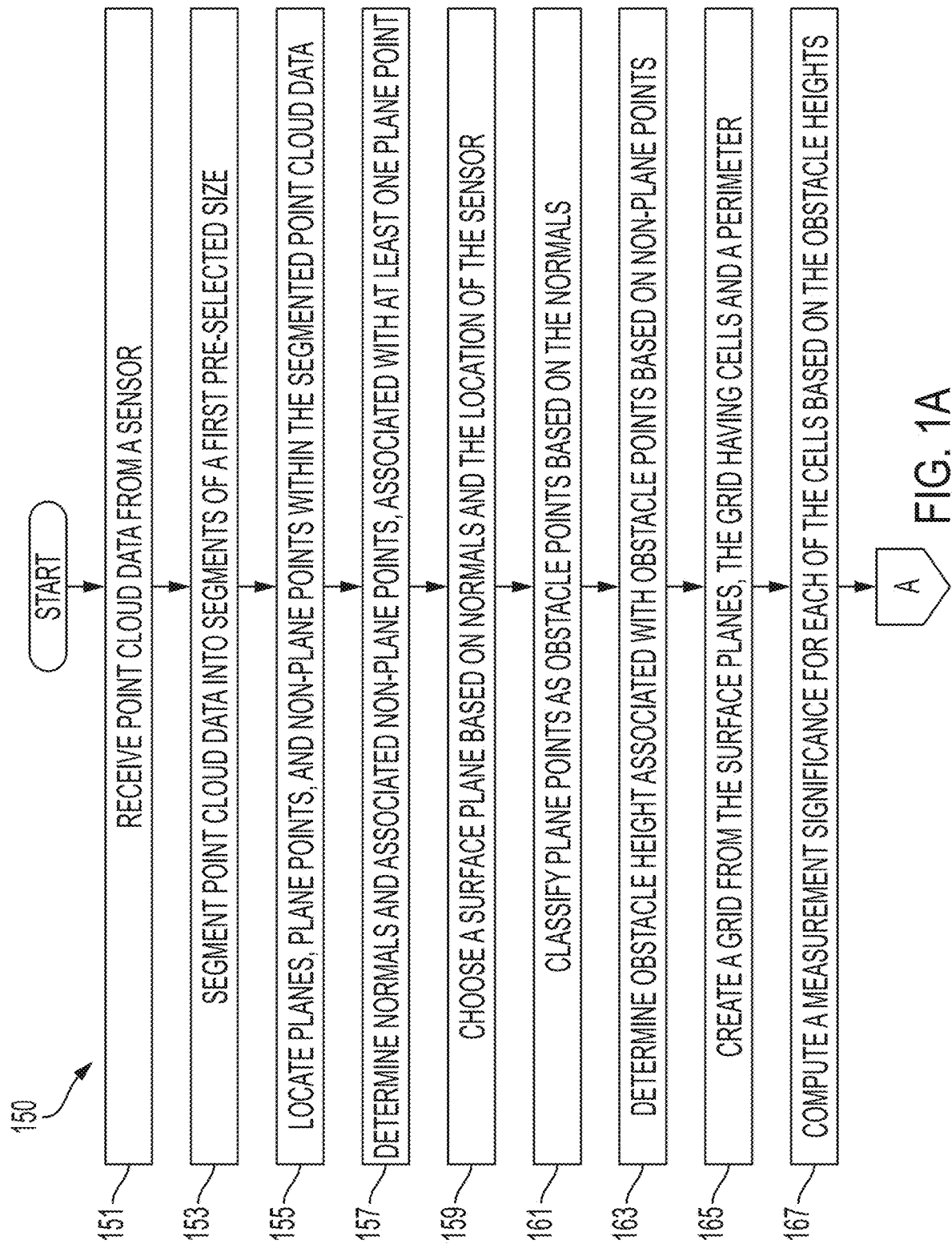
Figure 1B:
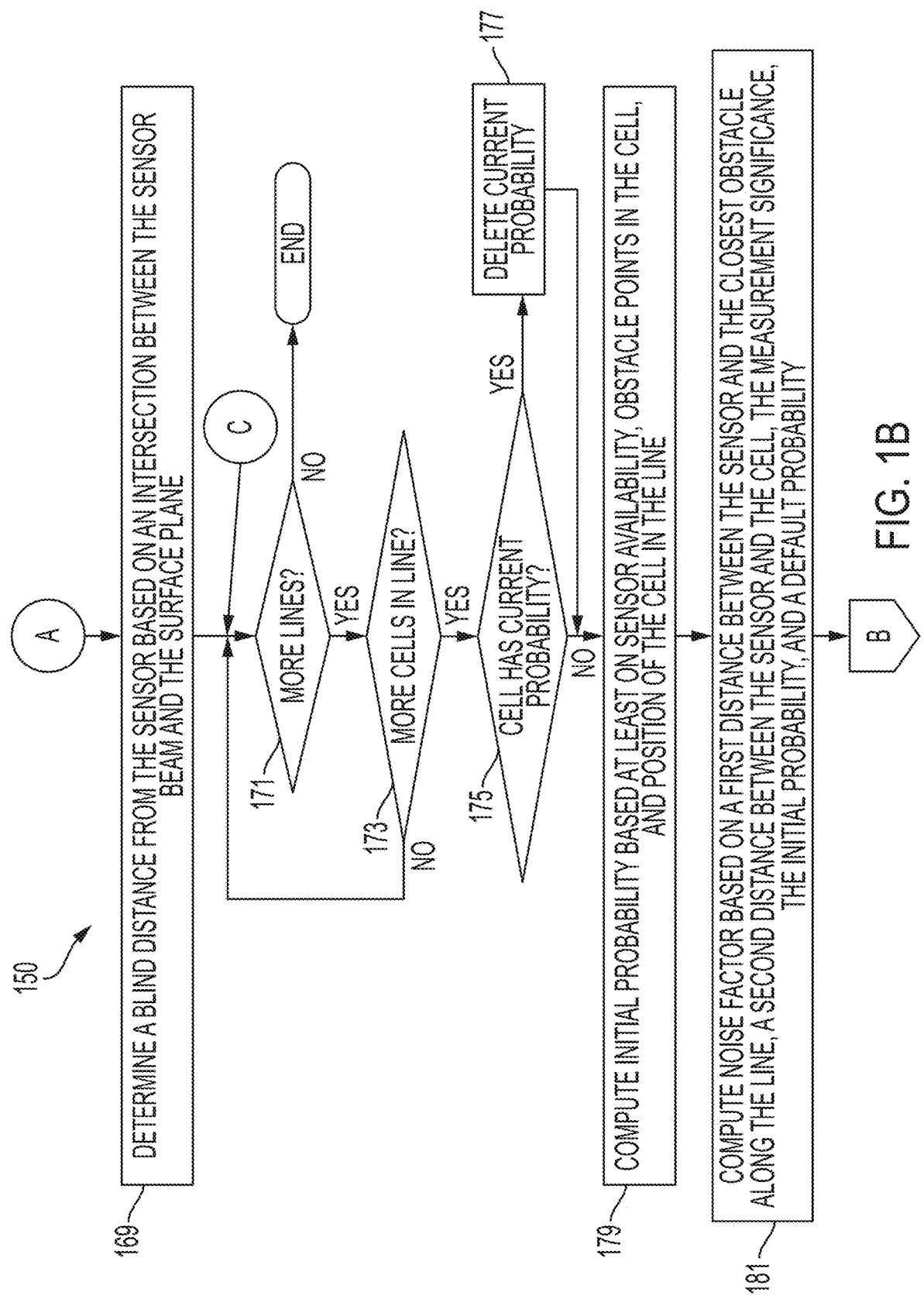

Referring now to FIGS. 1A-1C, free space can be estimated from sensor data by sweeping 360 from the sensor, which is placed at the center of a grid, to the perimeter of the grid. Probabilities are calculated and each cell is associated with a logodds of the occupied probability. Logodds can be forced to zero for all cells that fall within a blind radius and do not have a probability of being occupied. The blind radius is the area around the sensor that is blocked by the autonomous vehicle. During the sweep, if a cell has already been visited, new computations can replace previous computations. For each cell, an initial probability can be assigned to each cell based on initially-known information, such as, for example, but not limited to, whether the sensor beam was blocked or the sensor data were unavailable for any reason, and whether an obstacle can be found in the cell. For each cell that is visited outside of the blind radius, a noise factor can be computed. The noise factor recognizes that sensor noise can increase based at least on the distance between the sensor and any obstacles encountered. For each cell, the initial probability and the noise factor can be combined to produce a current probability for the cell, and the grid can be populated with the logodds probabilities. One advantage of drawing a line between the sensor and the perimeter of the grid is that it is possible to see what the sensor detects with a single beam. Another advantage is, if there are no valid returns along the line, it can be assumed that the sensor was blocked or for some other reason unavailable along that line.

Continuing to refer to FIGS. 1A-1C, method 150 for assigning free space probabilities in point cloud data, where the point cloud data can be associated with an autonomous vehicle traveling on a surface, the method can include, but is not limited to including, receiving 151 the point cloud data from a sensor. The sensor can include a sensor beam, and the sensor beam can project at least from the sensor to the surface. Method 150 can include segmenting 153 the point cloud data into segments of a first pre-selected size, and locating 155 planes, plane points in the planes, and non-plane points associated with at least one of the plane points within the point cloud data. Method 150 can include determining 157 normals to plane points and determining the non-plane points associated with the plane points, and choosing 159 at least one of the planes as a surface plane according to pre-selected criteria based at least on the normals and the location of the sensor. Method 150 can include classifying 161 each of the plane points as an obstacle point based at least on the associated non-plane points, determining 163 obstacle height associated with the obstacle points based at least on the non-plane points, and creating 165 a grid from the surface planes. The grid can include a pre-selected number of cells and a perimeter. Method 150 can include computing 167 a measurement significance for each of the cells based at least on the obstacle heights in the cells, and determining 169 a blind distance from the sensor based at least on an intersection between the sensor beam and the surface plane. The measurement significance can optionally include a value ranging between about 0.09 and 1.0 that can be calculated based on the sum of all obstacle heights in that cell. The higher the total height, the larger is the significance of the measurement. In some configurations, measurement significance=0.09*(28.2*the sum of the obstacle heights in the cell). In some configurations, measurement significance can be restricted to a range of between 0.0.09 and 1.0. If 171 there are more lines to process, and if 173 there are more cells in a line, and if 175 the cell doesn't have a current probability, method 150 can include computing 179 an initial probability of obstacles occupying the cell along the line. If 175 the cell has a current probability, method 150 can include deleting 177 the current probability. The initial probability can be based at least on availability of the sensor, the obstacle points in the cell, and a position of the cell along the line with respect to the sensor. For each cell along each line between the blind distance and the perimeter, method 150 can include computing 181 a noise factor for the cell. The noise factor can be based at least on a first distance between the sensor and a closest of the obstacles along the line in the cell, a second distance between the sensor and the cell along the line, the measurement significance for the cell along the line, the initial probability for the cell along the line, and a default probability. The default probability can include, but is not limited to including, a value of 0.5.

For each cell along each line between the blind distance and the perimeter, method 150 can include computing 183 a current probability of the obstacles occupying the cell along the line. The current probability can be based at least one the initial probability for the cell and the noise factor for the cell. The first pre-selected size can optionally include about 40 m×40 m×2 m. The pre-selected criteria can optionally include choosing the surface plane when the normals of the at least one plane do not face the sensor. The pre-selected number of cells can optionally include 400×400. Computing the initial probability can optionally include (a) if the sensor is unavailable and the cell is a near cell, the near cell being near the blind distance, the initial probability of the cell=0.9, (b) if the sensor is unavailable and the cell is between the near cell and the perimeter, the initial probability of the cell=0.5, (c) if the sensor is available and there is at least one of the obstacle points in the cell, or if one of the cells along the line that was previously encountered included at least one of the obstacle points, the initial probability of the cell=0.5, and (d) if the sensor is available and there are none of the obstacle points in the cell and none of the cells previously encountered along the line included at least one of the obstacle points, the initial probability of the cell=0.3. Computing the noise factor can optionally include computing:

$$((\text{measurement significance}/(\sigma\sqrt{2\pi}))+0.5-\text{the initial probability of the cell})*\exp(-0.5*((d-Z_t)/\sigma)^2) \quad (1)$$

wherein
d=the second distance,
$Z_t$=the first distance, and
$\sigma=Z_t^2*0.001$.

For example, if $Z_t$=10 meters, d=7 meters, and the initial probability=0.3. In this case, σ=0.1, the exp value ~0, making the noise factor ~0. On the other hand, if the distance between the sensor and the observation is closer to the distance between the sensor and the cell, the noise factor will be non-zero. For example, if $Z_t$=10 meters, d=9.9 meters, the measurement significance=0.09, and the initial probability=0.3, then, σ=0.1, and the exp value 0.6065. The noise factor=((0.09/(0.1*√(2π)))+0.5-0.3)*0.6065=0.339, making sensor noise more important in determining the occupancy probability of the cell. Computing the current probability can optionally include adding the noise factor of the cell to the initial probability of the cell. The at least one plane can optionally include the non-plane points up to a first pre-selected distance from the at least one plane. The first pre-selected distance can optionally include about 2 m.

Figure 2:
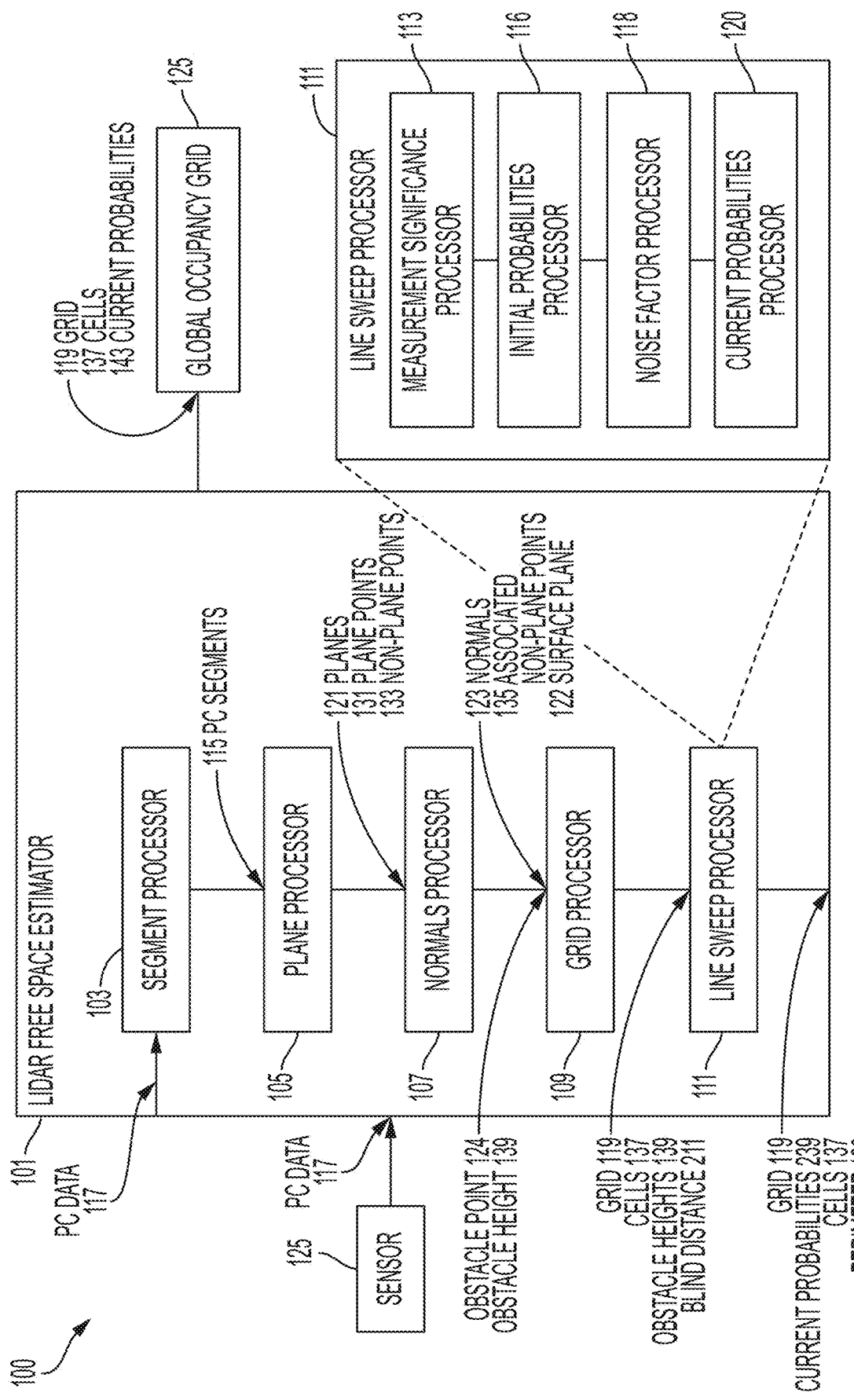
FIG. 2 is a schematic block diagram of the system of the present teachings.
Figure 3:
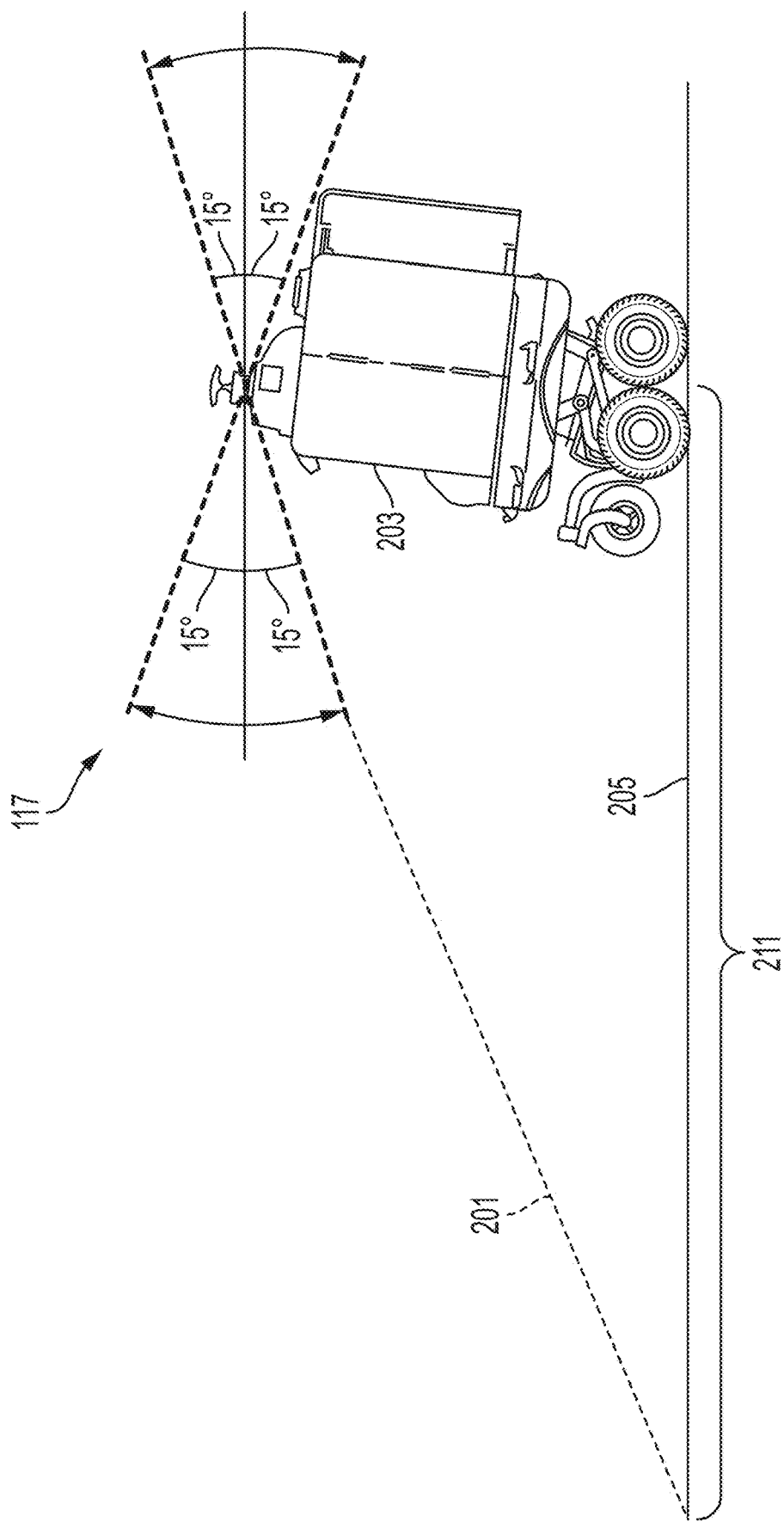
FIG. 3 is a pictorial diagram of sensor configuration of the present teachings.
Figure 4:
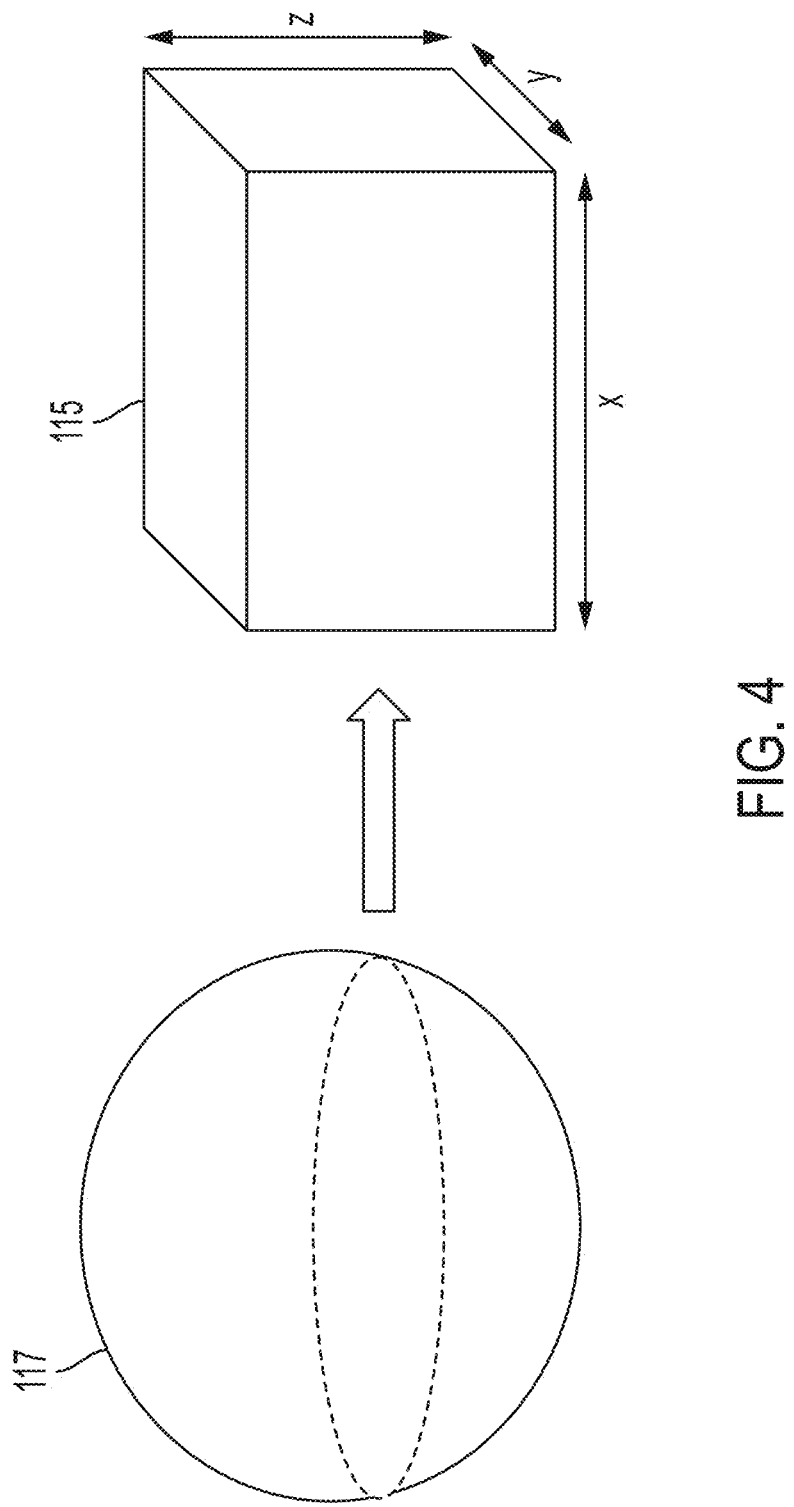
FIG. 4 is a pictorial diagram of segmented point cloud data of the present teachings.
Figure 5:
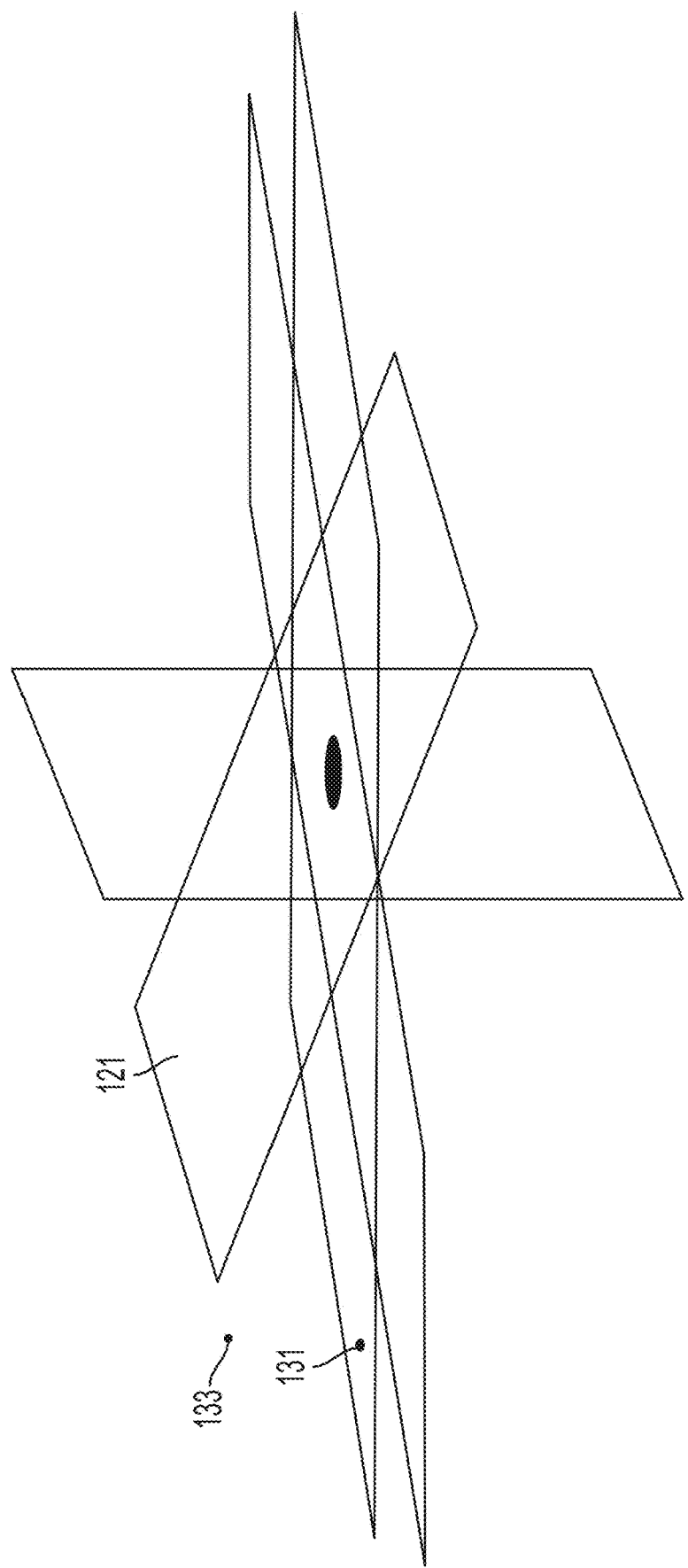
FIG. 5 is a pictorial diagram of planes within the segmented data of the present teachings.
Figure 6:
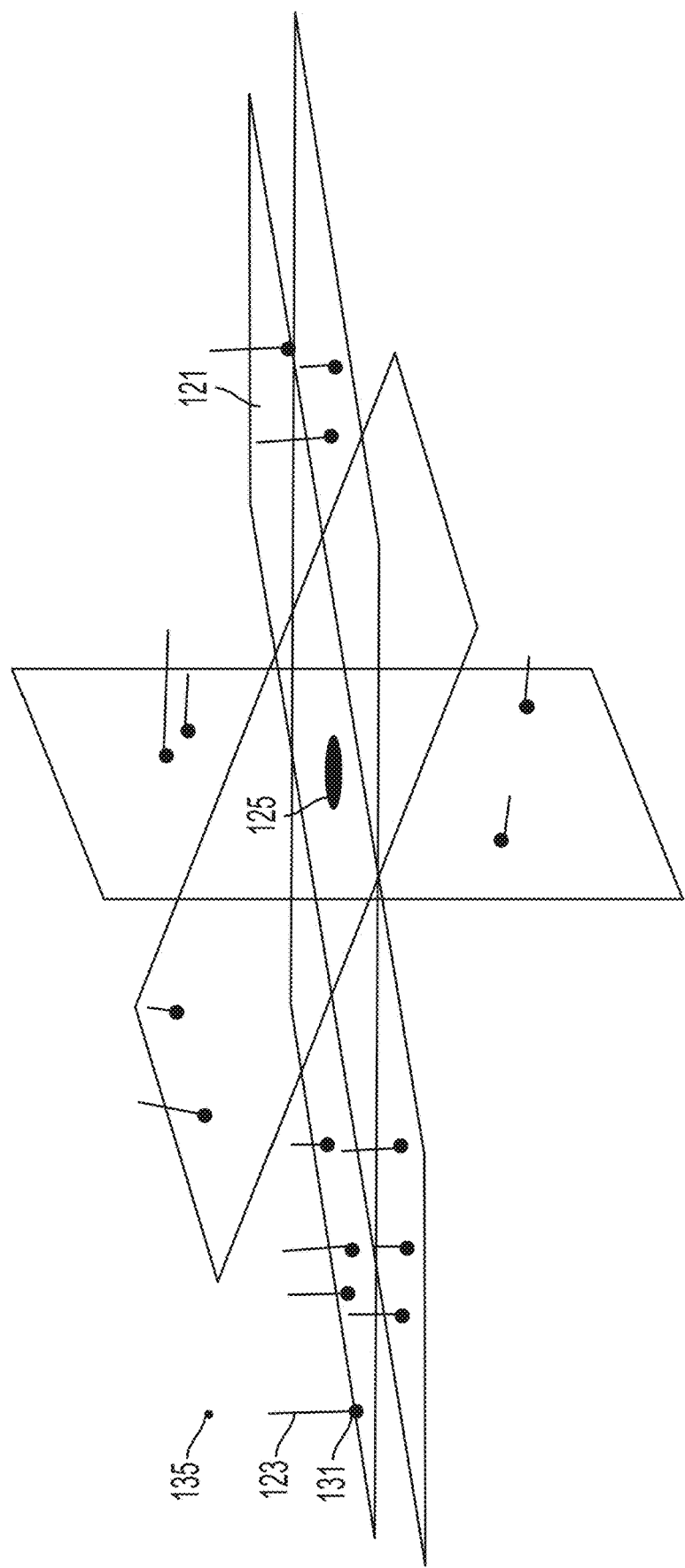
FIG. 6 is a pictorial diagram of normals of the present teachings.
Figure 7:
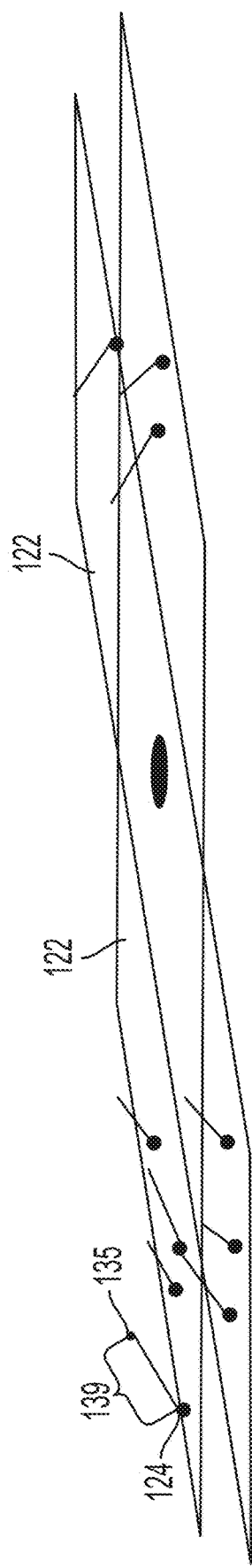
FIG. 7 is a pictorial diagram of obstacle points of the present teachings.
Figure 8:
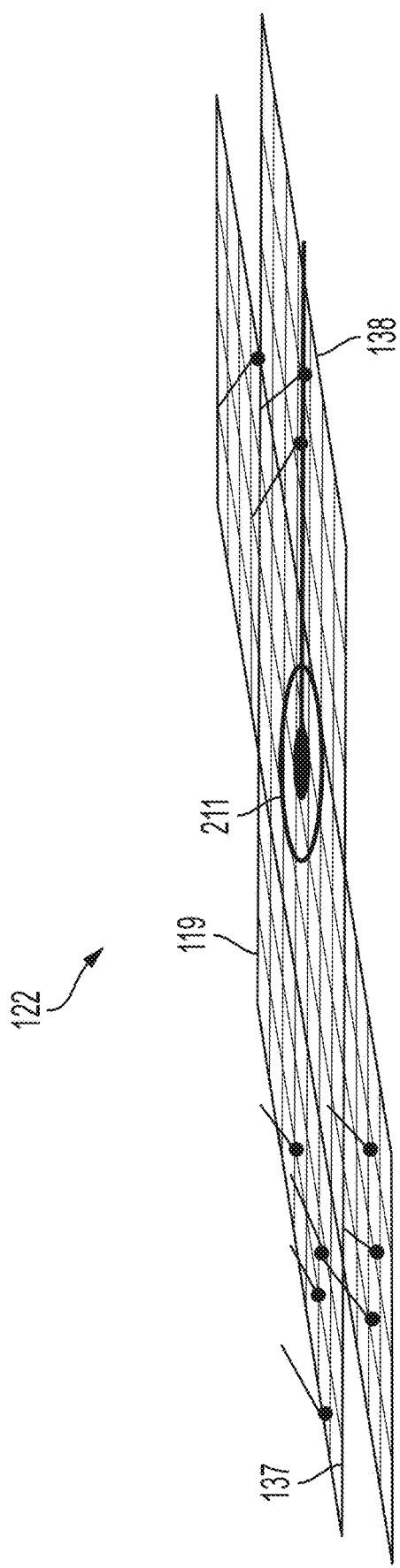
FIG. 8 is a pictorial diagram of the obstacle grid, blind radius, and sensor beam of the present teachings.

Referring now primarily to FIG. 2, system 100 for assigning free space probabilities in point cloud data 117, where point cloud data 117 can be associated with autonomous vehicle 203 (FIG. 3) traveling on surface 205 (FIG. 3), system 100 can include, but is not limited to including, sensor 125 having sensor beam 201 (FIG. 3) that can project at least from sensor 125 to surface 205 (FIG. 3). System 100 can include LIDAR free space estimator 101 that can include, but is not limited to including, segment processor 103 that can receive point cloud data 117 from sensor 125 and segment point cloud data 117 (FIG. 4) into segments 115 (FIG. 4) of a first pre-selected size x/y/z (FIG. 4). LIDAR free space estimator 101 can include plane processor 105 that can locate, within point cloud segments 115 (FIG. 5), planes 121 (FIG. 5), plane points 131 (FIG. 5) in planes 121 (FIG. 5), and non-plane points 133 (FIG. 5) associated with at least one of plane points 131 (FIG. 5). LIDAR free space estimator 101 can include normals processor 107 that can determine normals 123 (FIG. 6) to plane points 131 (FIG. 6) and can determine non-plane points 135 (FIG. 6) associated with plane points 131 (FIG. 6). Normals processor 107 can choose at least one of planes 121 (FIG. 6) as surface plane 122 (FIG. 7) according to pre-selected criteria based at least on normals 123 (FIG. 6) and the location of sensor 125. Normals processor 107 can classify each of plane points 131 as obstacle point 124 based at least on associated non-plane points 135 (FIG. 7), and normals processor 107 can determine obstacle height 139 (FIG. 7) associated with obstacle points 124 (FIG. 7) based at least on non-plane points 135 (FIG. 7). LIDAR free space estimator 101 can include grid processor 109 that can create grid 119 (FIG. 8) from surface planes 122 (FIG. 7). Grid 119 (FIG. 8) can include a pre-selected number of cells 137 (FIG. 8) and perimeter 138 (FIG. 8). LIDAR free space estimator 101 can include line sweep processor 111 that can include measurement significance processor 113. Measurement significance processor 113 can compute a measurement significance for each of cells 137 (FIG. 8) based at least on obstacle heights 139 (FIG. 7) in cells 137 (FIG. 8).

Figure 9:
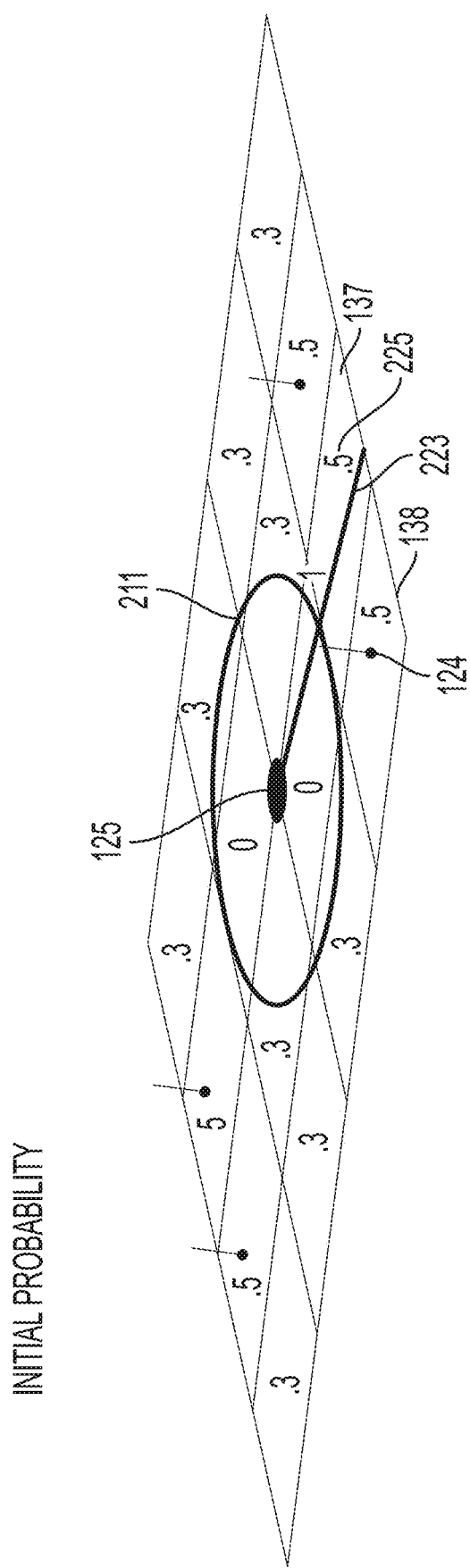
FIG. 9 is a pictorial diagram of initial probabilities of the present teachings.
Figure 10:
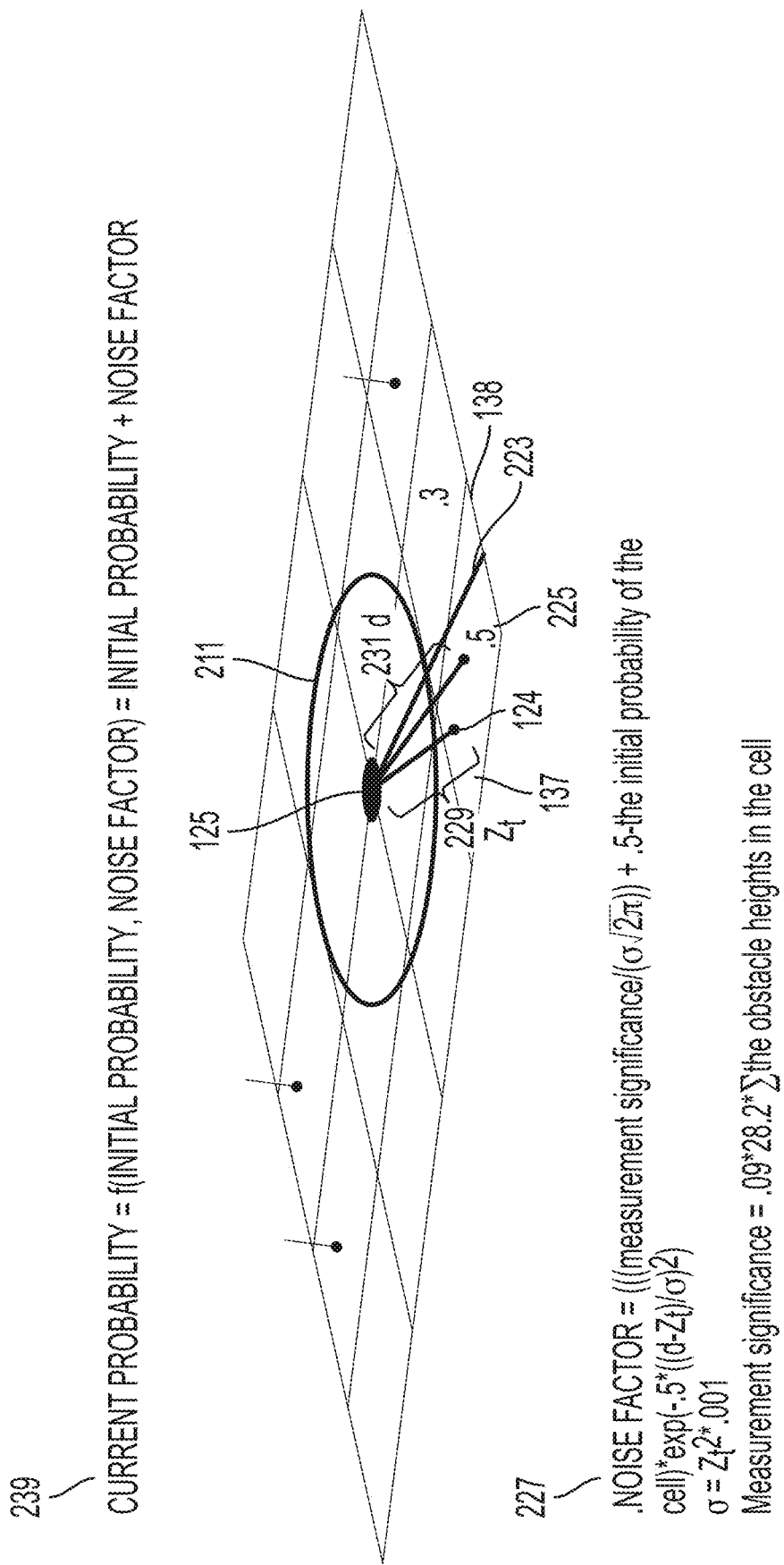
FIG. 10 is a pictorial diagram of current probabilities of the present teachings.

Continuing to refer primarily to FIG. 2, line sweep processor 111 can include initial probabilities processor 116 that can determine blind distance 211 (FIGS. 3, 9) from sensor 125 based at least on an intersection between sensor beam 201 (FIG. 3) and surface plane 205 (FIG. 3). Initial probabilities processor 116 can, for each cell 137 (FIG. 9) along each line 223 (FIG. 9) between blind distance 211 (FIG. 9) and perimeter 138 (FIG. 9), compute initial probability 225 (FIG. 9) of obstacles occupying cell 137 (FIG. 9) along line 223 (FIG. 9). Initial probability 225 (FIG. 9) can be based at least on availability of sensor 125, obstacle points 124 (FIG. 9), if any, in cell 137 (FIG. 9), and a position of cell 137 (FIG. 9) along line 223 (FIG. 9) with respect to sensor 125. Line sweep processor 111 can include noise factor processor 118 that can, for each cell 137 (FIG. 9) along each line 223 (FIG. 9) between blind distance 211 (FIG. 9) and perimeter 138 (FIG. 9), compute noise factor 227 (FIG. 10) based at least on first distance 229 (FIG. 10) between sensor 125 (FIG. 10) and closest of obstacle points 124 (FIG. 10) along line 223 (FIG. 10) in cell 137 (FIG. 10), second distance 231 (FIG. 10) between sensor 125 (FIG. 10) and cell 137 (FIG. 10) along line 223 (FIG. 10), the measurement significance for cell 137 (FIG. 10) along line 223 (FIG. 10), initial probability 225 (FIG. 10) for cell 137 (FIG. 10) along line 223 (FIG. 10), and a default probability. Line sweep processor 111 can include current probabilities processor 119 that can, for each cell 137 (FIG. 10) along each line 223 (FIG. 10) between blind distance 211 (FIG. 10) and perimeter 138 (FIG. 10), compute current probability 239 (FIG. 10) of obstacle points 124 (FIG. 10) occupying cell 137 (FIG. 10) along line 223 (FIG. 10). Current probability 239 (FIG. 10) can be based at least on initial probability 225 (FIG. 10) for cell 137 (FIG. 10) and noise factor 227 (FIG. 10) for cell 137 (FIG. 10). Segment 115 (FIG. 4) can optionally include a shape in which x=40 m, y=40, and z=2 m, for example. Surface planes 122 (FIG. 7) can optionally be chosen because their normals 123 (FIG. 6) do not face sensor 125 (FIG. 6). Surface planes 122 (FIG. 8) can optionally include 400 cells in an x-direction and 400 cells in a y-direction.

Figure 9A:
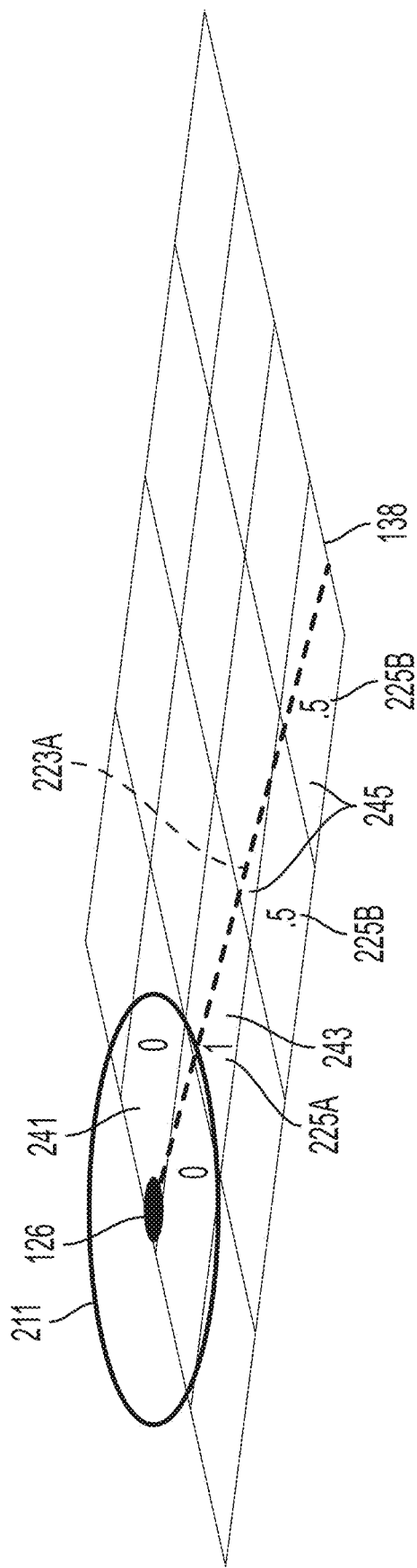
FIG. 9A is a pictorial diagram of probabilities when the sensor is unavailable.

Referring now to FIG. 9A, when sensor 126 becomes unavailable, initial probability 225A in cell 243 along line 223A that is nearest blind distance 211 can be set to 1.0. Cell 241 within blind distance 211 can have a probability set to 0 because the autonomous vehicle is occupying the cell. Line 223A is the line a sensor beam would traverse if sensor 126 were not blocked or otherwise unavailable. When sensor 126 becomes unavailable, initial probability 225B in cells 245 along line 223A that fall between cell 243 and perimeter 138 can be set to 0.5.

Figure 9B:
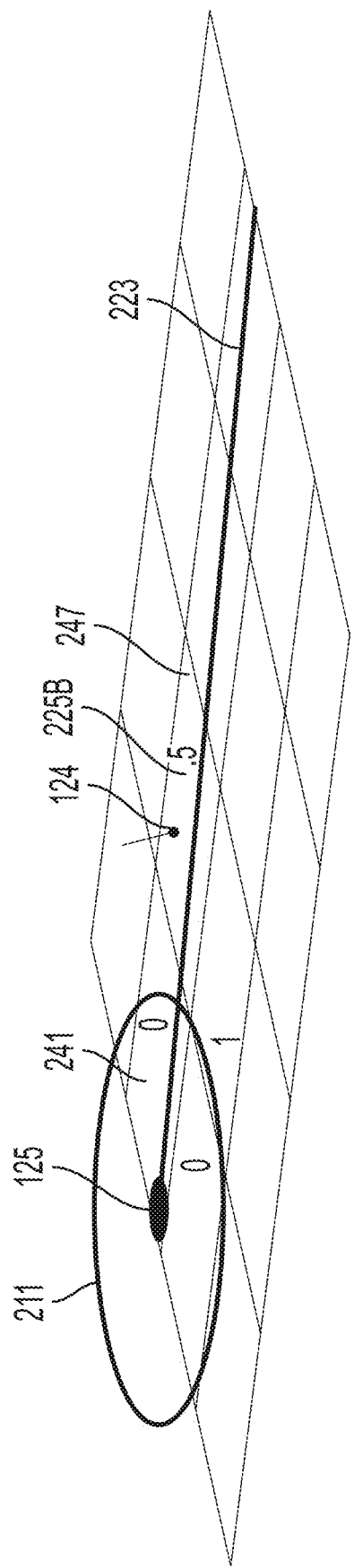
FIG. 9B is a pictorial diagram of probabilities when the sensor is available.

Referring now to FIG. 9B, if sensor 125 is available, initial probability 225B can be set to 0.5 if there is at least one of obstacle points 124 in cell 247.

Figure 9C:
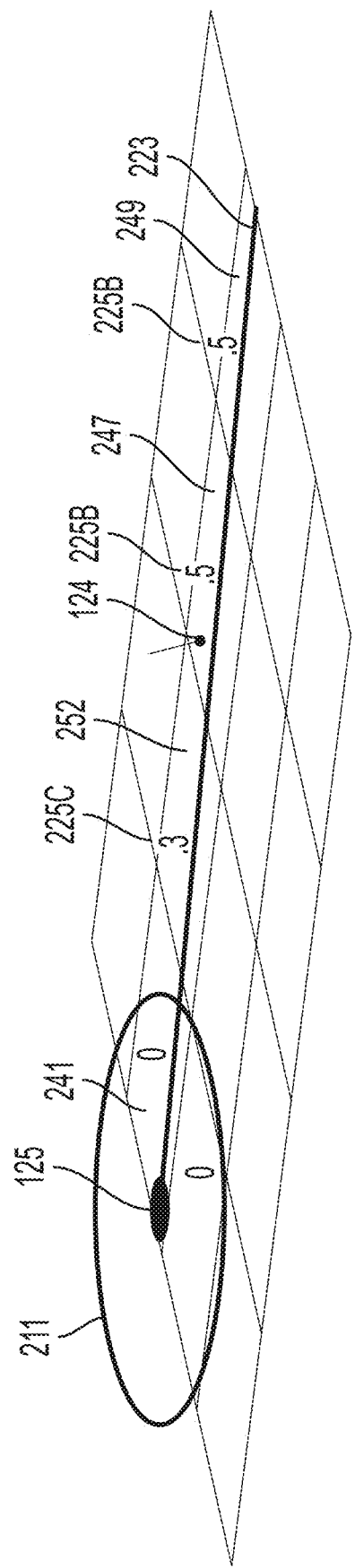
FIG. 9C is a pictorial diagram of probabilities when the sensor is available and a cell includes an obstacle.

Referring now to FIG. 9C, if sensor 125 is available, initial probability 225B for cell 249 can be set to 0.5 if one of the cells along line 223, for example, cell 247, that was previously encountered during the traversal of line 223 included at least one of obstacle points 124. If sensor 125 is available and there are none of obstacle points 124 in cell 252, for example, and none of the cells that were previously encountered along line 223 included at least one of obstacle points 124, initial probability 225C of cell 252 can be set to 0.3.

Referring now to FIG. 10, noise factor 227 can depend upon the sum of all obstacle heights 139 (FIG. 7) in cell 137, for example. Noise factor 227 can depend upon the square of first distance $Z_t$ 229, and the difference between first distance $Z_t$ 229 and second distance d 231, and upon initial probability 225. Current probability 239 can be computed as the sum of initial probability 225 and noise factor 227.

Figure 11A:
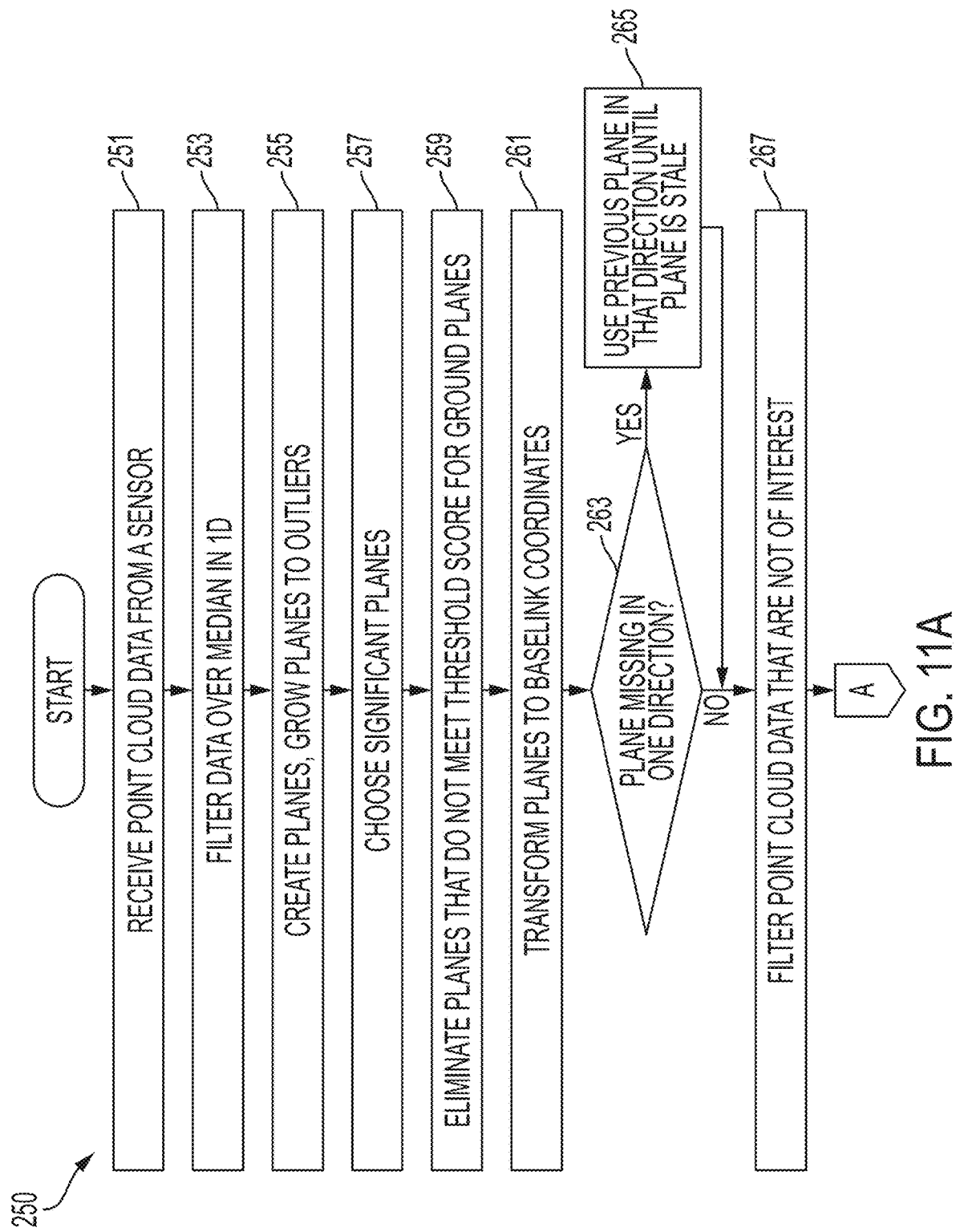
FIGS. 11A and 11B are flowcharts of the method of the present teachings.
Figure 11B:
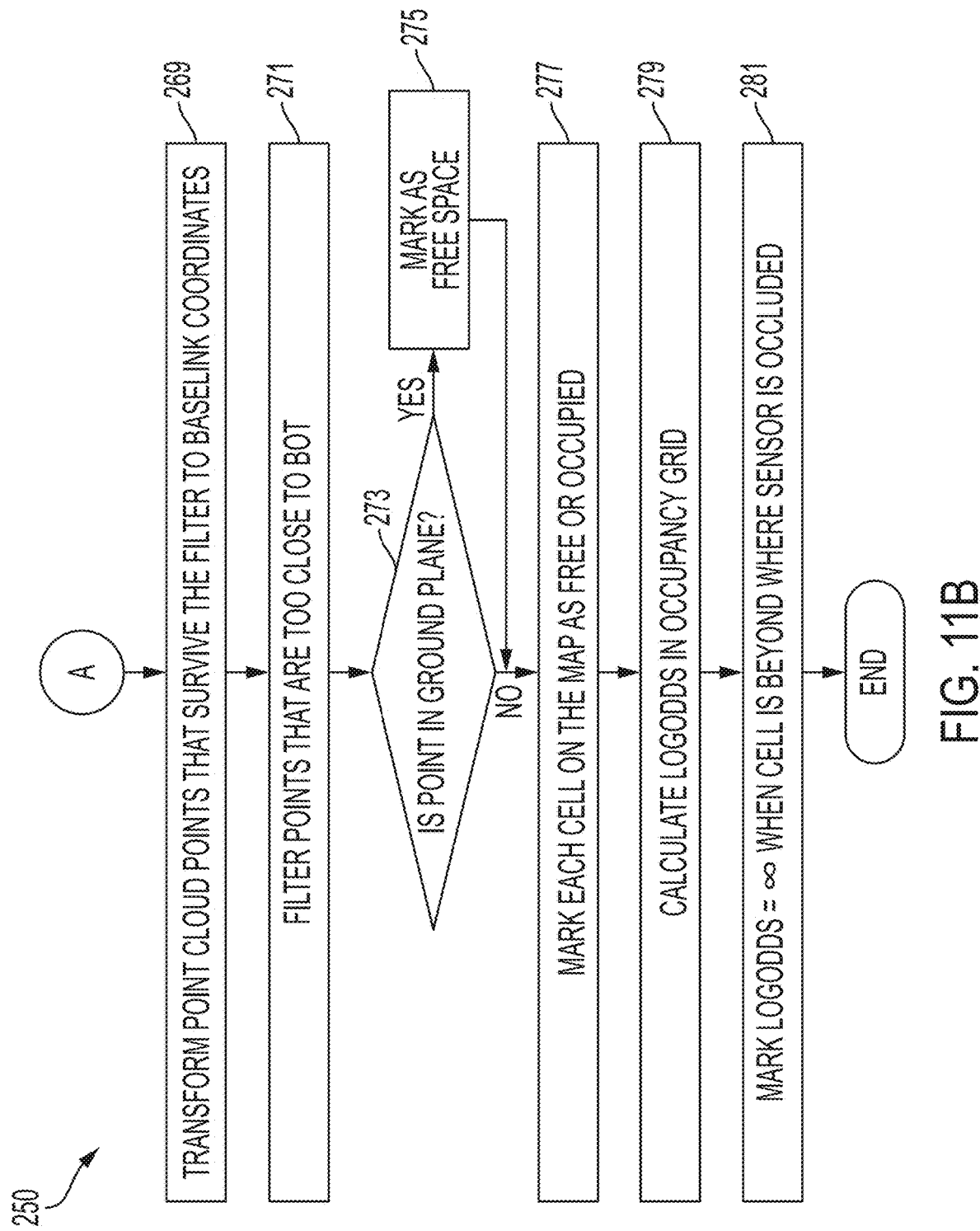

Referring now to FIGS. 11A and 11B, in another configuration, free space estimation using point cloud data can include locating ground planes from the point cloud data, marking points from the point cloud as free space if they are located on a ground plane, and saving obstructed and free space designations in an occupancy grid as logodds data. Method 250 for performing these functions can include, but is not limited to including, receiving 251 point cloud data from a sensor, filtering 253 data over the data median in one dimension, creating 255 planes and growing planes to outliers, choosing 257 significant planes, eliminating 259 planes that do not meet threshold score for ground planes, and transforming 261 planes to baselink coordinates. If 263 there are not planes representing points in front of, to the left of, to the right of, and behind the autonomous vehicle, method 250 can include using 265 a previously-used plane that had been available in the immediate previous time step until the previously-used plane had been used in this way for a pre-selected number of iterations. When the previously-used plane has been used up to the pre-selected number of iterations, a default plane can be used. If 263 there are planes representing points in front of, to the left of, to the right of, and behind the autonomous vehicle, method 250 can include filtering 267 point cloud data that are not of interest, transforming 269 point cloud points that survive the filter to baselink coordinates, and filtering 271 transformed points that are too close to the autonomous vehicle. If 273 a transformed and filtered point is located in a ground plane, method 250 can include labeling 275 the point as free space, otherwise, the point is labeled as an obstacle. Method 250 can include labeling 277 each cell on a grid map as free or occupied, depending upon point markings, calculating 279 logodds in an occupancy grid, and setting 281 logodds to ∞ when the cell is beyond the point where the sensor is occluded.

Figure 12A:
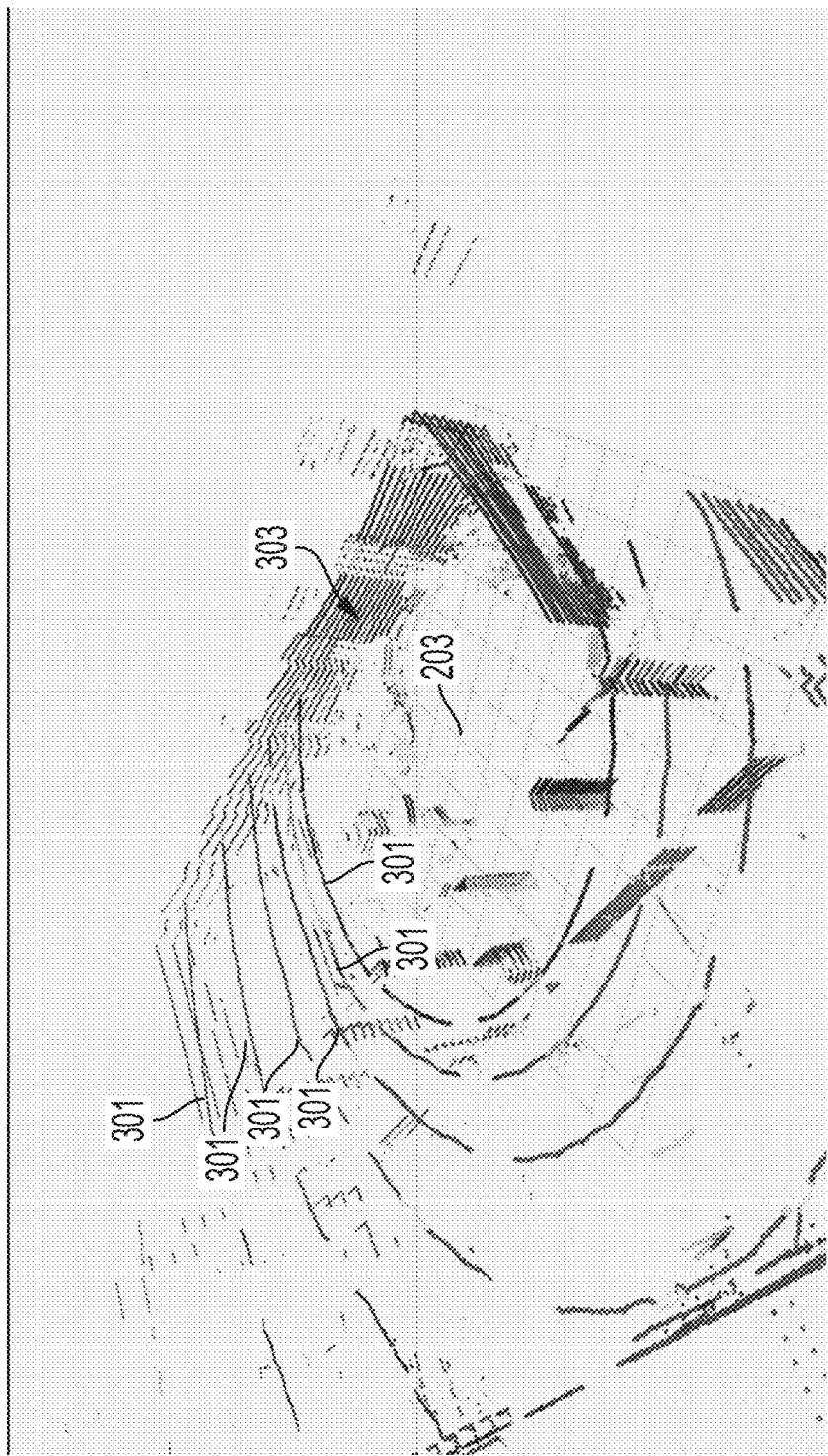
FIG. 12A is a photographic representation of LIDAR rings around an autonomous vehicle.

Referring now to FIG. 12A, point cloud data can be received as 1D string 303 of points along each LIDAR ring 301 surrounding autonomous vehicle 203. In some configurations, three 1D arrays can be used to store x, y, and z points. All points along a LIDAR ring can be stored in order of azimuth angle, and the LIDAR rings can be stored consecutively in a row major fashion. Each of the rings can be divided into segments of a pre-selected size, for example, but not limited to, 64 points.

Figure 12B:
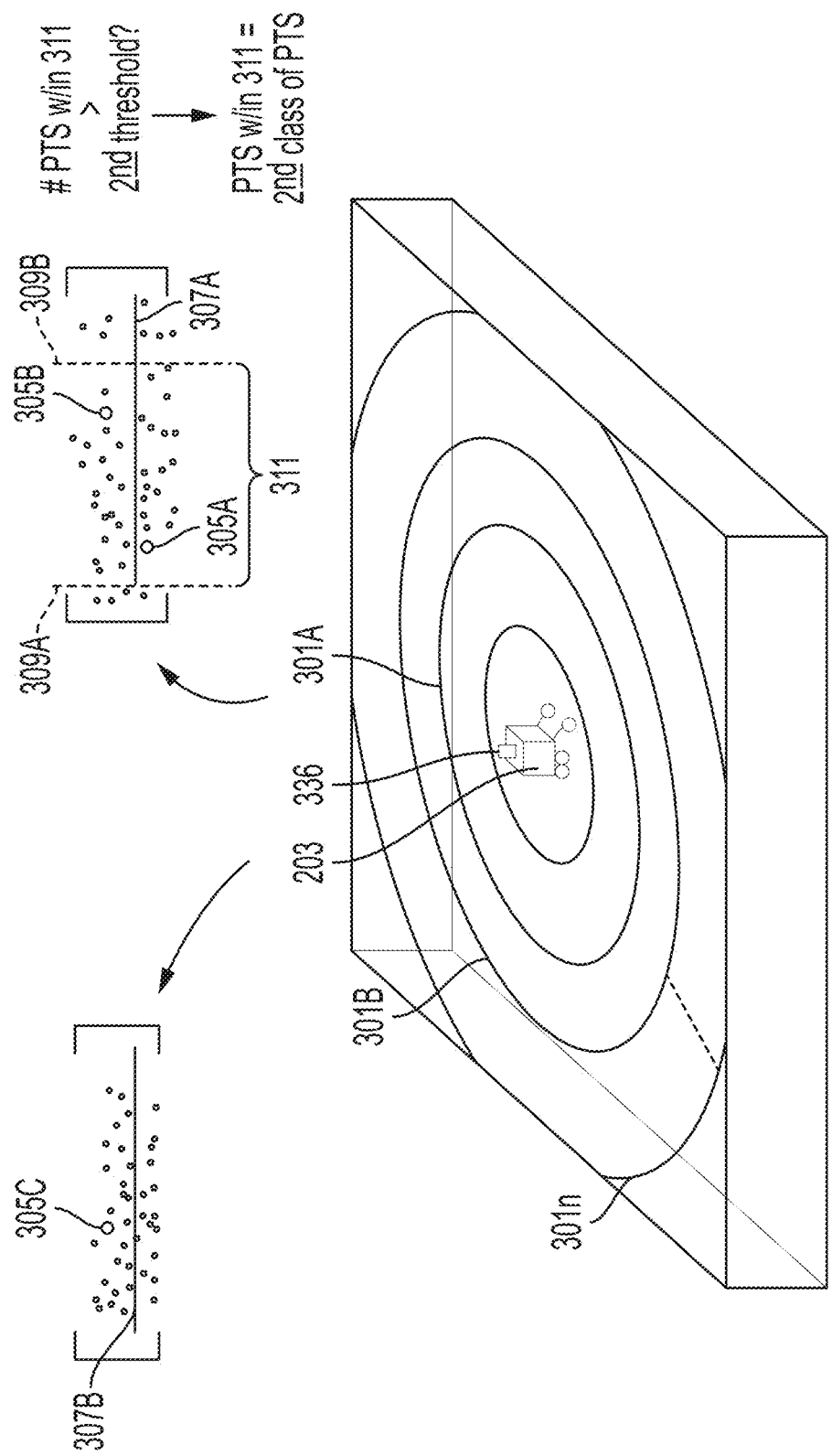
FIG. 12B is a pictorial representation of steps of the method of the present teachings.

Referring now to FIG. 12B, 1D string 303 can be filtered according to a process that can include, but is not limited to including, filtering 1D string 303 around the median of the points of 1D string 303 in each LIDAR data ring. Filtering can include locating points with measured values close to the median and eliminating the rest of the points for this part of the analysis. In some configurations, values that are close to the median are less than 0.1 m from the median. The points that have passed the median filter can be termed a first class of points. Along the median can be found discontinuities in the point data. Discontinuities can be identified in any suitable way, for example, but not limited to calculating the Cartesian distance between points, comparing the distance to a first pre-selected threshold, and identifying discontinuities 309A/309B (FIG. 12B) or edges of the data as a second class of points when the distance between the points is greater than the first pre-selected threshold. In some configurations, discontinuities arise when $$\mathrm{abs}(D2-D1)>0.08*2*A$$

where
P1=last good point
P3=point being tested
P2/P3=consecutive points
D1=distance between P2 and sensor
D2=distance between P3 and sensor
2=# of points since last good point
A=(D1+D2)/2

The points between discontinuities 309A/309B (FIG. 12B) can be counted and labeled as a third class of points if the number of points exceeds a second pre-selected threshold. In some configurations, the second pre-selected threshold can include eight points. Points lying between other pairs of discontinuities can be discarded.

Figure 13:
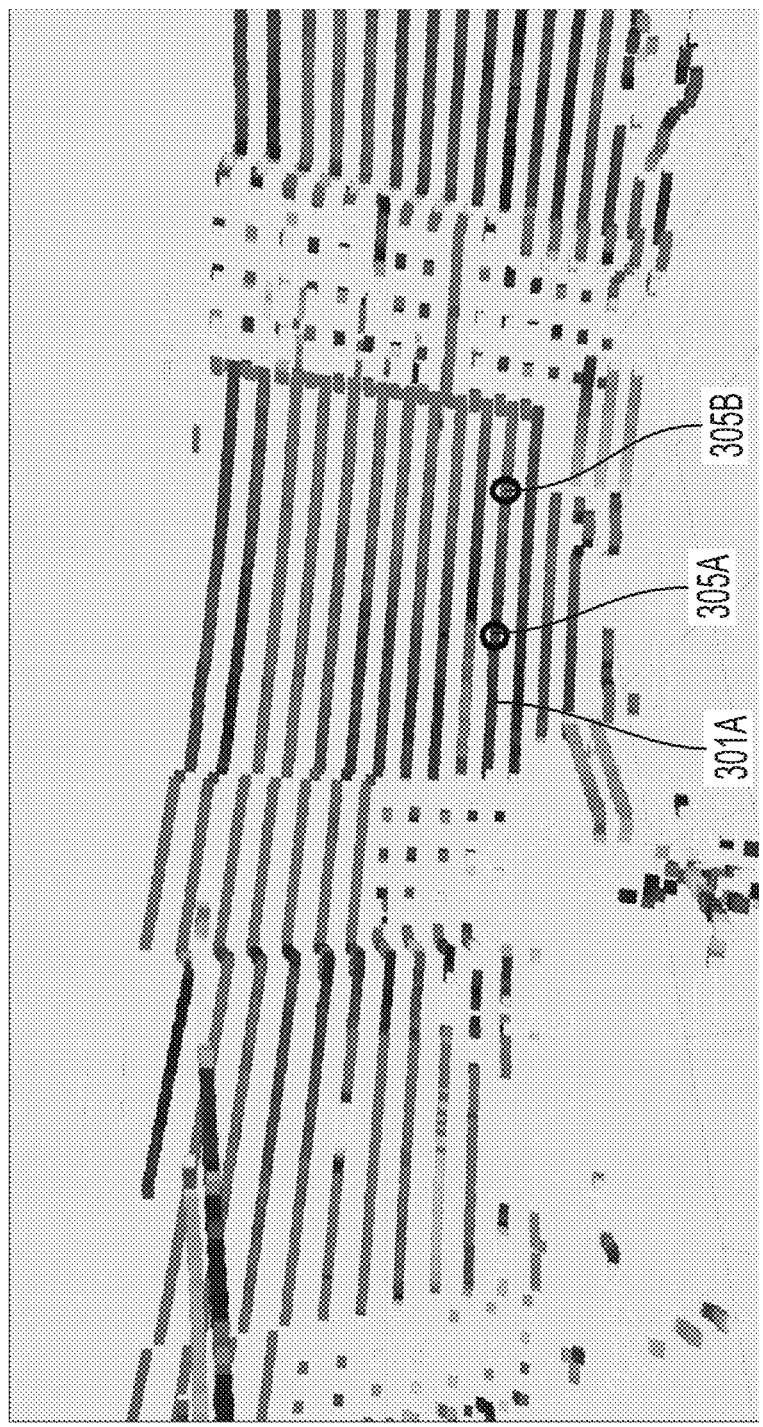
FIG. 13 is a photographic representation of point choices on a LIDAR ring.

Referring now to FIG. 13, significant planes are expected to fit the terrain around the autonomous vehicle. They have relatively low residual error, are large enough, and are generally representative of the ground points around the autonomous vehicle. In some configurations, a residual error threshold can include 0.1. To determine significant planes, points can be chosen, such as first point 305A and second point 305B, from points on the same ring. In some configurations, first point/second point 305A/B can be selected at random from the third class of points lying between adjacent discontinuities 309A/309B. Other criteria can be used to increase the probability that the points belong to a significant plane.

Figure 14A:
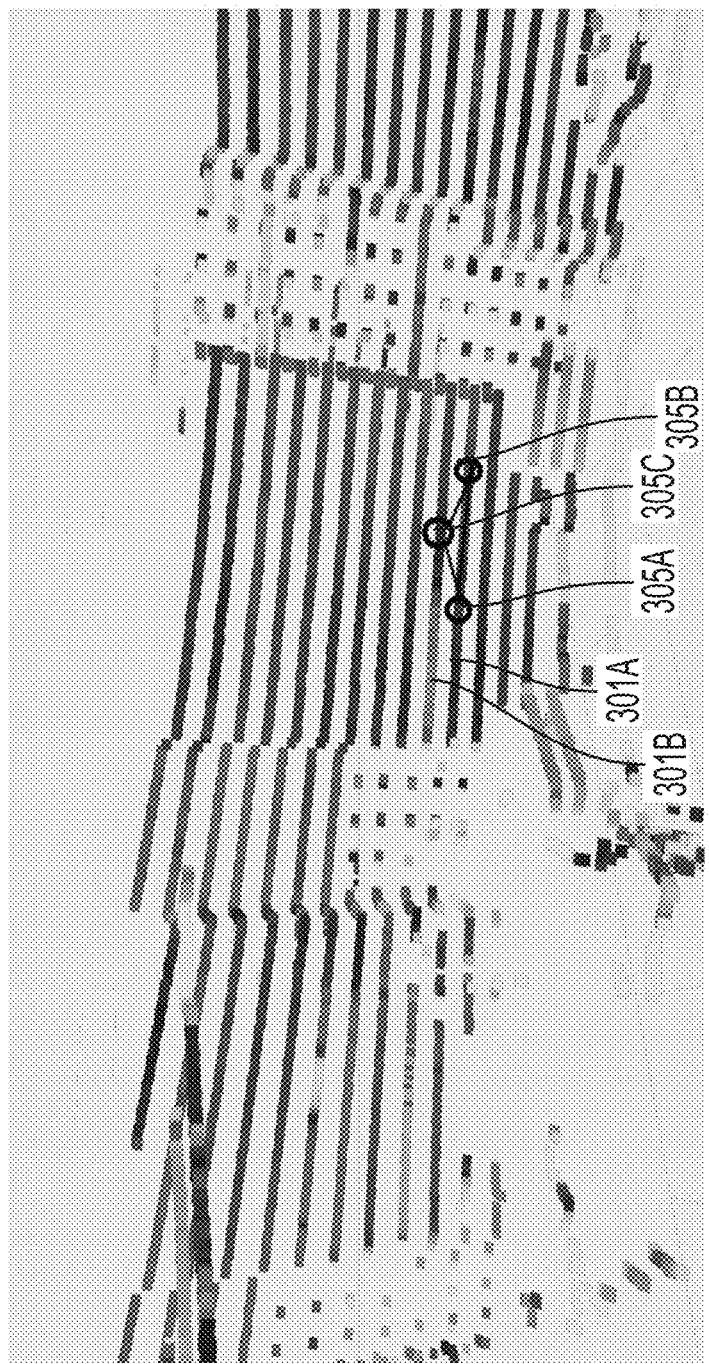
FIG. 14A is a photographic representation of point choices on adjacent LIDAR rings.
Figure 14B:
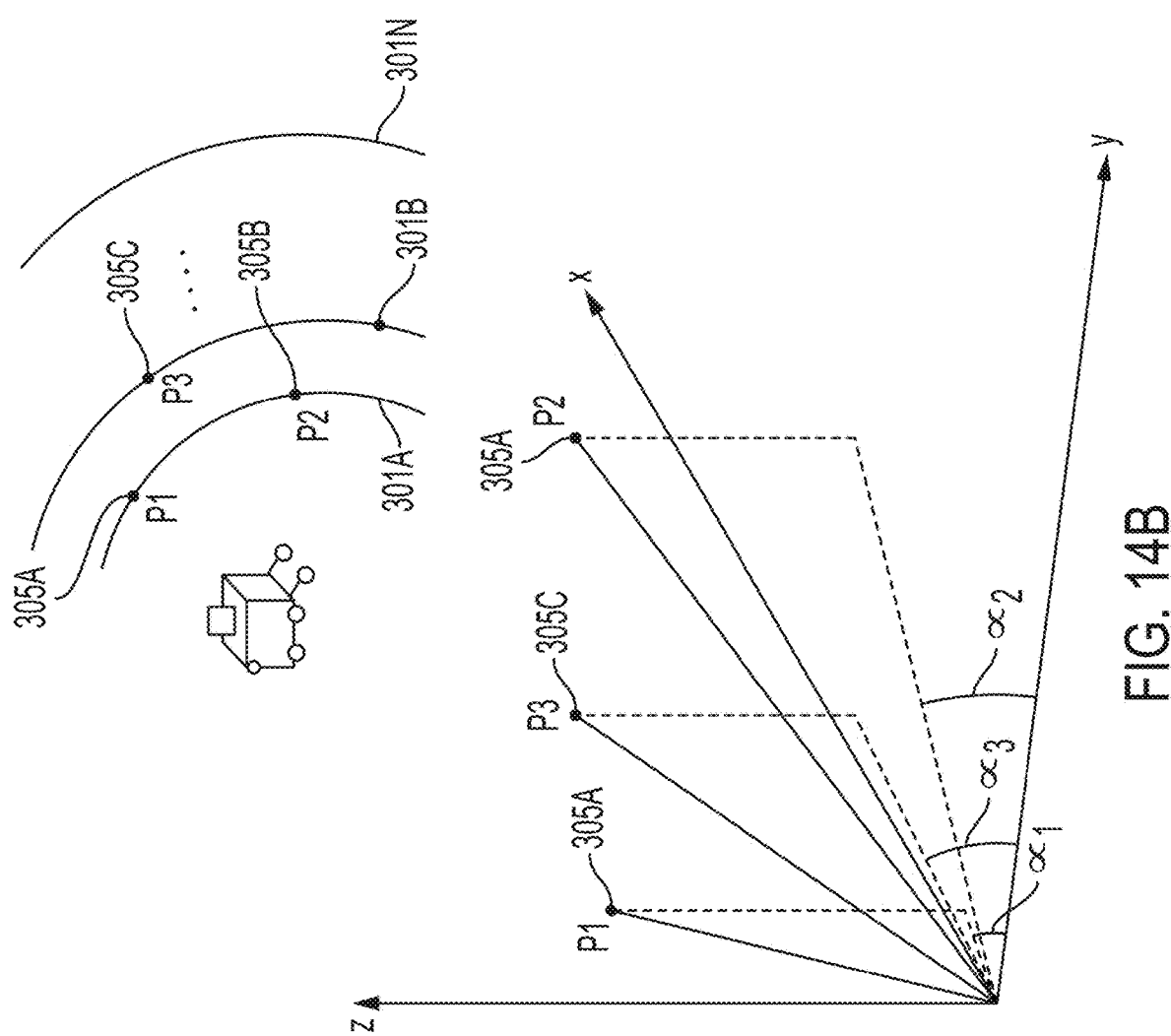
FIG. 14B is a pictorial representation of further steps of the method of the present teachings.

Referring now to FIGS. 14A and 14B, third point 305C can be selected from adjacent ring 301B. Third point 305C can have an azimuth angle $\alpha_3$ that can lie between the azimuth angles $\alpha_1$ and $\alpha_2$ of first point 305A and second point 305B. First/second/third points 305A/B/C form a plane having a defining equation that can be evaluated for its relationship to a gravity vector. In some configurations, evaluating the plane can include checking the orientation of the plane by choosing planes having a normal vector no more than 60° with respect to the gravity vector provided by, for example, but not limited to, an inertial measurement sensor located on the autonomous vehicle. As the planes are grown and points are added, the orientation angle can be scaled down to 20°.

Figure 15:
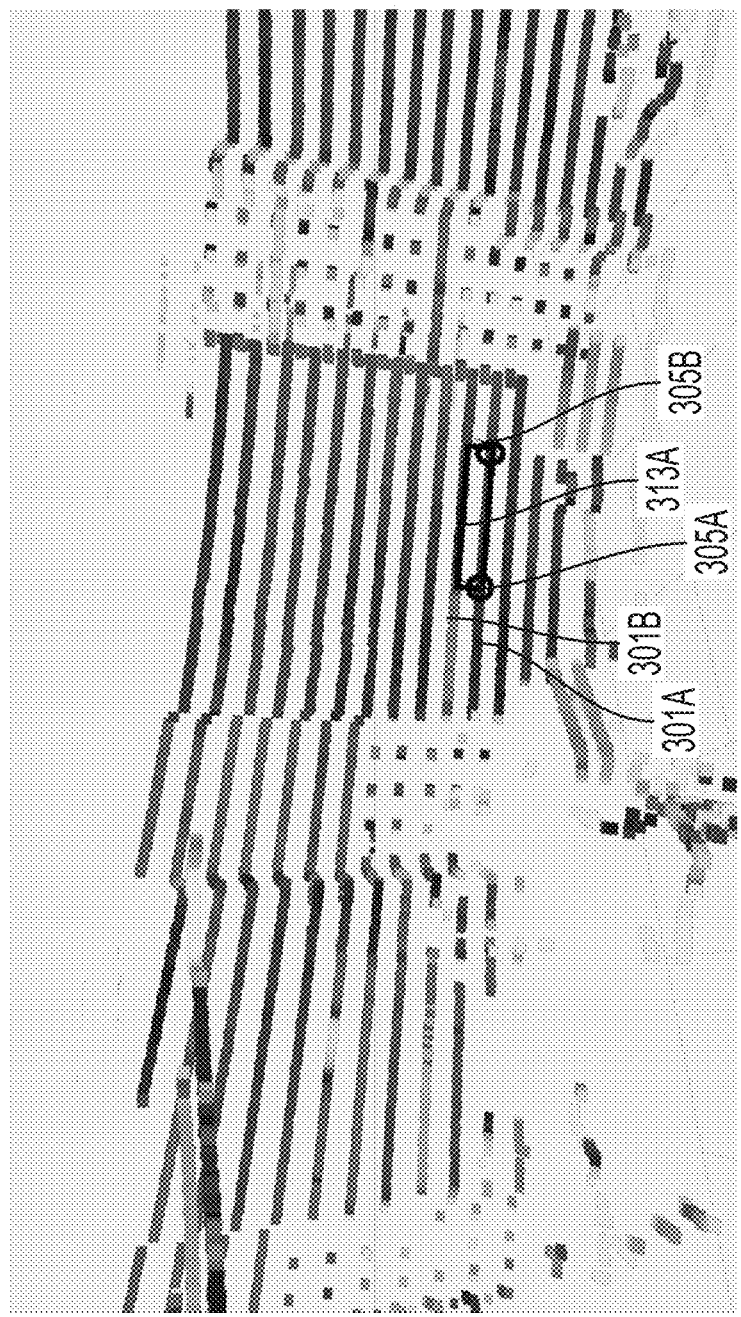
FIG. 15 is a photographic representation of phase one of plane growing of the present teachings.

Referring now to FIG. 15, all points remaining from previous filter steps stated herein can be evaluated for their inclusion in polygon 313A. The edges of polygon 313A can be defined by first/second points 305A/305B and rings 301A/B.

Figure 16:
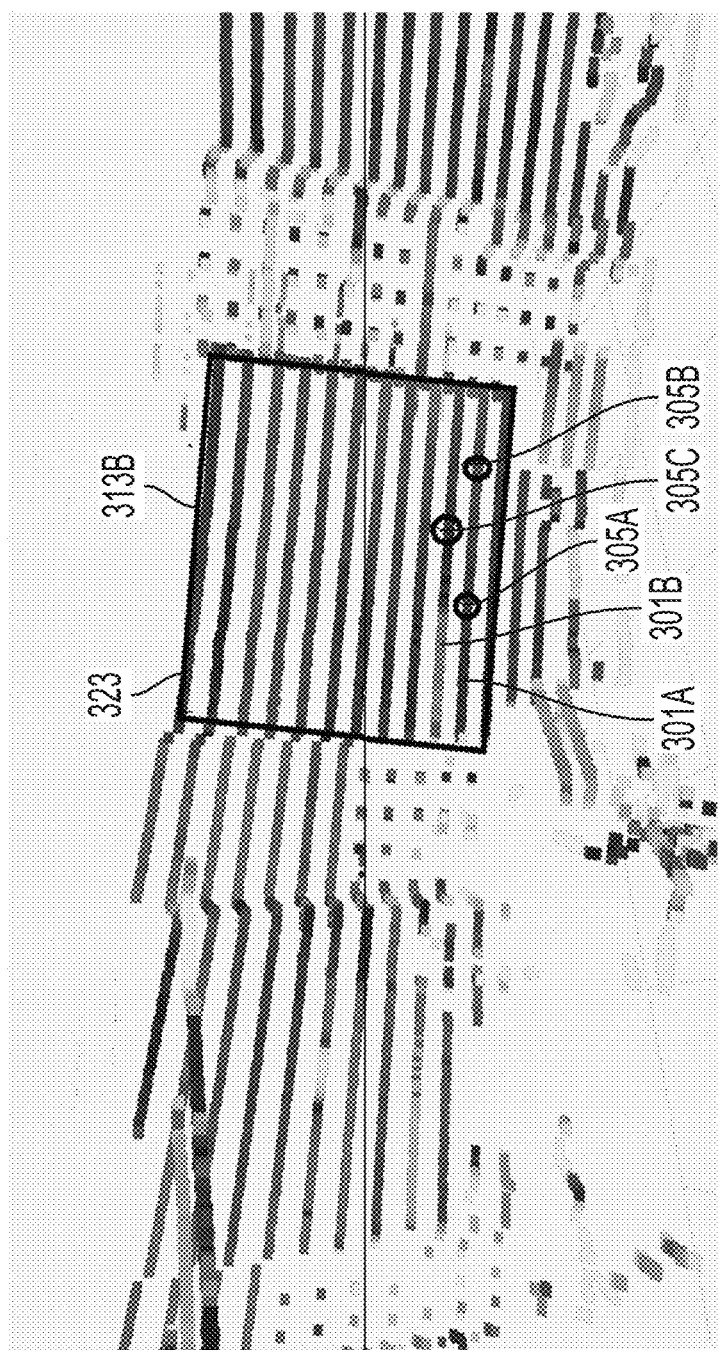
FIG. 16 is a photographic representation of phase two of plane growing of the present teachings.

Referring now to FIG. 16, the plane can be grown in four directions and vertically, forming polygon 313B. Growing the plane can include evaluating points in all four directions away from the autonomous vehicle towards rings and along azimuth angles that are farther and farther from originally-chosen polygon 313A of points. The plane can be grown as described herein, and the plane equation can be updated based on the newly-included points, and evaluated for orientation with respect to the gravity vector. Each direction can grow independently until the residual error for that side breaks the threshold or if the side reaches edge 323 of the point cloud. At that time, orientation and residual error checks can be made and, if passed, the plane can be classified as preliminarily significant. Additional checks like number of points, number of growth cycles, and number of vertical growth cycles etc. can be performed to assist in further filtering. If a plane has experienced ten lateral growth cycles or two vertical growth cycles and the plane is not deemed significant, plane growth for that plane can be terminated.

Figure 17:
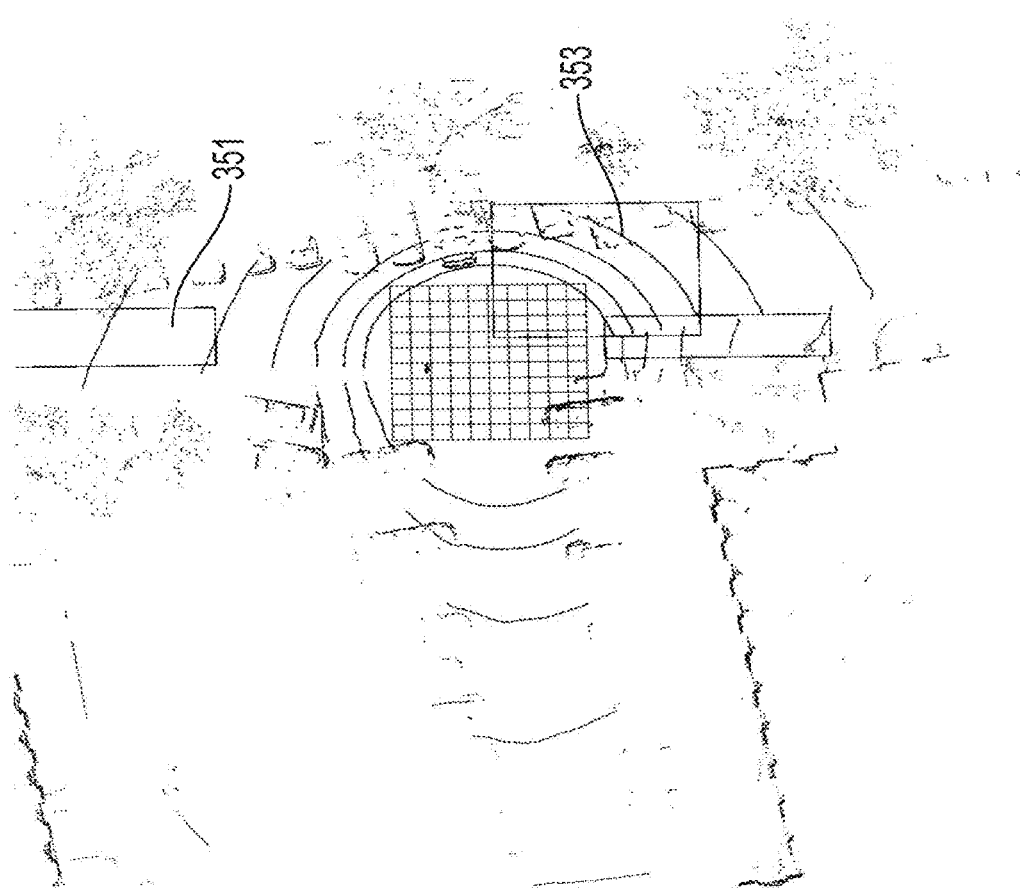
FIG. 17 is a pictorial representation of a pattern of LIDAR ring arcs formed by a ground plane discovered by the method of the present teachings.

Referring now to FIG. 17, data from rings 353 can be assessed as described herein to form planes 351. From the set of significant planes, surface planes can be identified by subjecting the planes to a scoring function such as, for example, but not limited to:

$$\text{Residual Score} = \begin{cases} 100 & \text{if, residual\_error} < 0.001 \\ \dfrac{-10000*\text{residual\_error}}{9+\left(\dfrac{910}{9}\right)} & \text{if, } 0.001 \leq \text{residual\_error} < 0.01 \\ \dfrac{-1000*\text{residual\_error}}{9}+\left(\dfrac{820}{9}\right) & \text{if, } 0.01 \leq \text{residual\_error} < 0.1 \\ -200*\text{residual\_error}+100 & \text{if, } 0.1 \leq \text{residual\_error} \end{cases}$$

$$\text{Growth Score} = \begin{cases} 100 & \text{if, num\_vGrowth} > 4 \\ 10*\text{num\_vGrowth}+60 & \text{if, num\_vGrowth} \leq 4 \end{cases}$$

$$\text{Area Score} = \frac{\arctan(0.7*planeArea)*180}{\pi}+10$$

$$\text{Angle Score} = \begin{cases} 100 & \text{if, angle} \leq 15 \\ \dfrac{-20*\text{angle}}{3}+200 & \text{if, angle} > 15 \end{cases}$$

Final Score = Residual Score + Growth Score + Area Score + Angle Score

The scoring function can be used to assess the quality of the planes, higher scores indicate more likely candidates, and planes that don't meet a pre-selected threshold are discarded.

Figure 18:
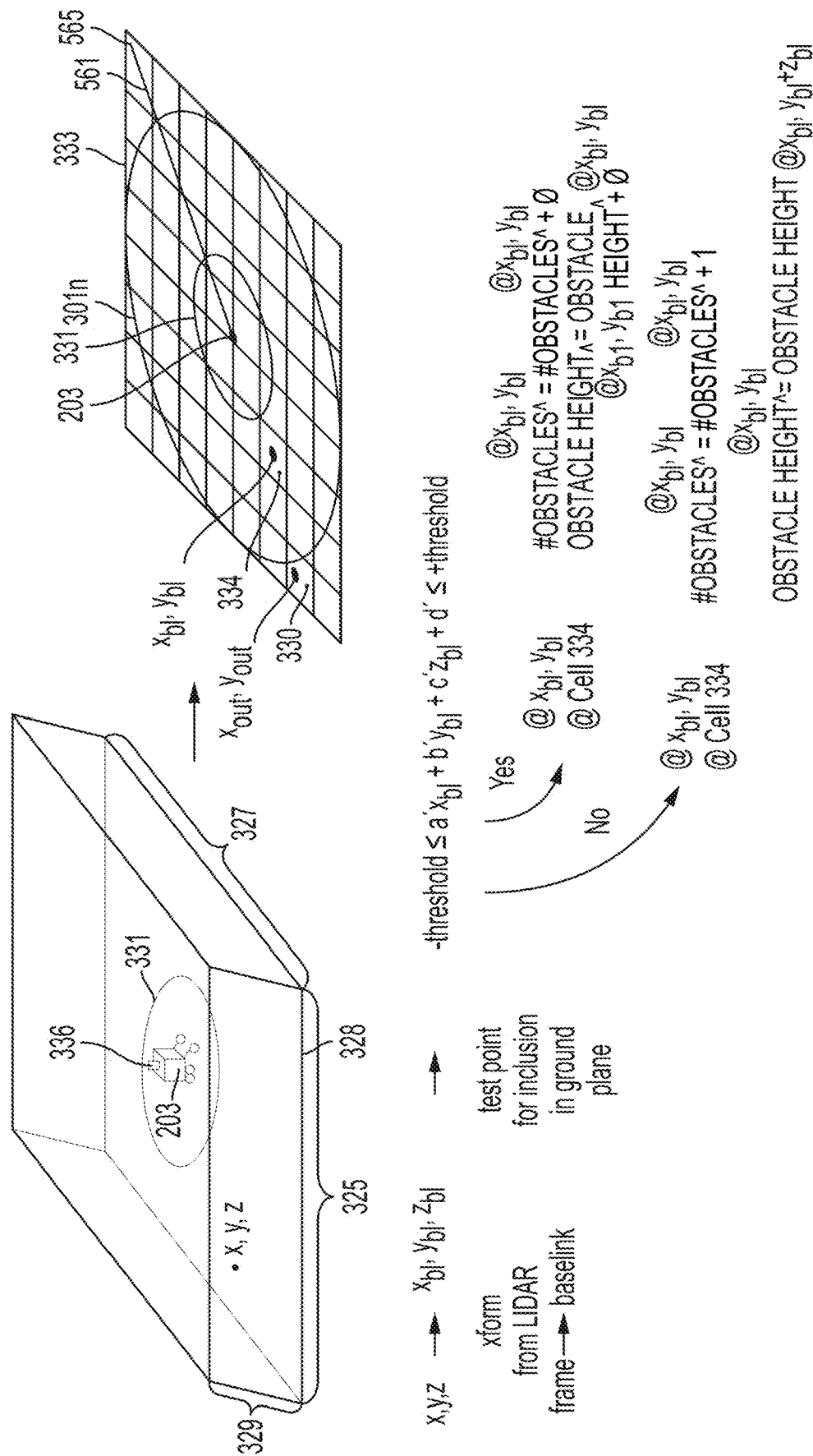
FIG. 18 is a pictorial representation of grid map updating of the present teachings.

Referring now to FIG. 18, points in the ground planes can be classified as obstacle or free space, and the odds of occupancy at particular locations can be determined. Ground planes can include planes to the right, left, front, and rear of the autonomous vehicle. Each plane is defined by a plane equation and by the type of plane it is. The coordinates of the planes are relative to the location of the sensor and must be transformed to the coordinate system of the autonomous vehicle, the baseline frame of reference. The ground planes each have an equation of the form ax+by+cz+d=0, where the coefficients are a, b, c, and d. To transform the ground plane equations to the baselink frame of reference, rotation and translation are required. One matrix can provide the transformation:

$$[R|t] = \begin{bmatrix} r_{1,1} & r_{1,2} & r_{1,3} & t_1 \\ r_{2,1} & r_{2,2} & r_{2,3} & t_2 \\ r_{3,1} & r_{3,2} & r_{3,3} & t_3 \end{bmatrix} \quad (2)$$

From the coefficients, a unity vector can be created:

$$\tilde{u} = \left[ \frac{a}{\sqrt[2]{a^2+b^2+c^2}}, \frac{b}{\sqrt[2]{a^2+b^2+c^2}}, \frac{c}{\sqrt[2]{a^2+b^2+c^2}} \right] \quad (3)$$

And d can be normalized:

$$d_{norm} = \frac{d}{\sqrt[2]{a^2+b^2+c^2}} \quad (4)$$

Transformed plane coefficients a, b, and c are:

$$\tilde{v} = [R|t]_{3\times 4} \begin{bmatrix} \tilde{u} \\ 0 \end{bmatrix}_{4\times 1} = \begin{bmatrix} a' \\ b' \\ c' \end{bmatrix}_{3\times 1} \quad (5)$$

Plane coefficient d can be transformed as follows:

$$\tilde{d} = [R|t]_{3\times 4} \begin{bmatrix} -d_{norm} * \tilde{u}_x \\ -d_{norm} * \tilde{u}_y \\ -d_{norm} * \tilde{u}_z \end{bmatrix} = \begin{bmatrix} \tilde{d}_x \\ \tilde{d}_y \\ \tilde{d}_z \end{bmatrix} \quad (6)$$

And d and d' can be solved for in the following equation:

$$a'^*\tilde{d}_x + b'^*\tilde{d}_y + c'^*\tilde{d}_z + d' = 0 \quad (7)$$

Therefore the transformed plane equation is:

$$a'x + b'y + c'z + d' = 0 \quad (8)$$

In the case in which ground planes are not found in all directions, a previously-used plane in the corresponding direction can be reused, unless the previously-used plane has become stale. A stale count can be maintained for each plane and a previously-used plane can be re-used if it has not exceeded its stale count and if a new plane is not available in its direction. An X/Y plane, in which plane coefficients a=0, b=0, c=1, z+d=0, where d is obtained from the translation in z between LIDAR and baselink frame, is appended to the list of planes in front, left, right and back by default. This is performed as a fail-safe condition for instances when no ground planes are detected.

Referring now to FIG. 18, the original point cloud data can be filtered according to, for example, x distance 327 and y distance 325 from the autonomous vehicle, and height 329 above the surface. These parameters and their thresholds can be adjusted based upon the application and the girth and height of the autonomous vehicle. In some configurations, the x distance can include 12.8 m and the y distance can include 12.8 m. The z distance 329 can include a height above which the autonomous vehicle is no longer concerned with whatever obstacle might be present, for example, the height of the point is high enough so that the autonomous vehicle would not encounter the obstacle that the point represents. Whatever points lie in the circumscribed area between blind area 331 and boundaries 325/327, and up to height 329, are transformed from the sensor frame of reference to the baselink frame of reference: $x_{bl}$, $y_{bl}$, $z_{bl}$. This transformation is obtained by multiplying LIDAR point (x,y,z) with a transformation matrix [R|t] encompassing rotation and translation between the two frames of reference according to equation (2). Therefore $(x_{bl}, y_{bl}, z_{bl}) = [R|t]*(x,y,z)$. A Euclidean distance from the autonomous vehicle for each point is computed. If the point satisfies the required boundary requirements, it is plugged into equation (7) for each of the ground planes and checked for satisfying the following inequality:

$$-\text{threshold} \le a'x_{bl} + b'y_{bl} + c'z_{bl} + d' \le +\text{threshold} \quad (9)$$

If the above condition is satisfied, then the point $x_{bl}$, $y_{bl}$, $z_{bl}$ is said to represent free space on gridmap 333. Otherwise, the point $x_{bl}$, $y_{bl}$, $z_{bl}$ is said to represent an obstacle on gridmap 333. Gridmap 333 of $x_{bl}$, $y_{bl}$ locations can be updated based on the results of executing equation (9). In particular, if the condition is satisfied, the values at point $x_{bl}$, $y_{bl}$ on gridmap 333 remain unchanged. If the condition is not satisfied, the number of obstacles at point $x_{bl}$, $y_{bl}$ on gridmap 333 is updated by 1, and the height of the obstacles is updated by the value of $z_{bl}$. In some configurations, the threshold can include a range of 4-10 in (0.102 m–0.0.254 m). In some configurations, the threshold can include 8 in (0.203 m).

Continuing to refer to FIG. 18, for each cell 334 in gridmap 333, a logodds that the cell is occupied can be computed based on a Gaussian probability, pMapCell, related to the characteristics of the point with respect to, for example, but not limited to, the distance between cell 334 and sensor 336, noise from sensor 336 (possibly as computed by equation (1)), whether the cell includes a measurement, the significance of the measurement, whether the cell includes an obstacle, the distance between the obstacle and the autonomous vehicle, whether the cell includes free space, and whether the laser is blocked. Significance of measurement is calculated as a product of height of obstacle at that cell, base significance and height normalizer. Base significance and height normalizer are empirically calculated constants. Therefore, the higher the height of obstacle, the higher is the significance of the measurement. The logodds can be computed according to equation (10):

$$\text{LogOdds} = \log\left(\frac{pMapCell}{1 - pMapCell}\right) \quad (10)$$

In some configurations, the pMapCell calculation is different for cells based on pre-selected conditions. For each cell along line 561 joining the position of the autonomous vehicle and end cell 565 of a gridmap, when there are no valid returns from the LIDAR sensor along line 561 joining the position of the autonomous vehicle and end position 565, something must be blocking the sensor. Therefore, the travel path for the autonomous vehicle should be blocked for safety. For cells that are 0.2 m surrounding the blind distance, pMapCell=PBlocked=0.9. This pMapCell value results in a maximum allowed probability of occupancy. For other cells, pMapCell=PUnknown=0.5. This value results in maximum uncertainty of occupancy. When there are no obstacles found along the line, this means that that line has free space, i.e. pMapCell=PMin=0.3, the minimum allowed probability of occupancy. When the autonomous vehicle encounters a cell that contains an obstacle:

pMapCell=pOccR+noiseFactor where pOccR=POnObstacle=0.5,
noiseFactor=((measurementSignificance/ (noiseStdDev*Root of 2Pi))+POnObstacle−pOccR) *gausianNoiseExponential
noiseStdDev=square of z_t*LidarNoise
LidarNoise is an empirical constant
gausianNoiseExponential=pow(EXP, (−0.5*pow (((d2Cell−z_t)/noiseStdDev), 2)))
z_t=euclidean distance to the obstacle from autonomous vehicle
d2cell=euclidean distance to the cell from autonomous vehicle
measurementSignificance=BaseSignificance* (HeightNormalizer*Total_Obstacle_Height)

When the autonomous vehicle encounters a cell in advance of or beyond a cell containing an obstacle:

pMapCell=pOccR+noiseFactor where pOccR=PMin=0.5,
noiseFactor=((measurementSignificance/ (noiseStdDev*Root of 2Pi))+POnObstacle−pOccR) *gausianNoiseExponential
noiseStdDev=square of z_t*LidarNoise
LidarNoise is an empirical constant
gausianNoiseExponential=pow(EXP, (−0.5*pow (((d2Cell−z_t)/noiseStdDev), 2)))
z_t=euclidean distance to the obstacle from autonomous vehicle
d2cell=euclidean distance to the cell from autonomous vehicle
measurementSignificance=BaseSignificance When the autonomous vehicle encounters a cell that is beyond the last obstacle, or when the cell is beyond the last measurement available from LIDAR, for example, beyond boundary 328, or at point $x_{out}$, $y_{out}$ 330, pMapCell=1.0 (results in infinite logodds)

In some configurations, BaseSignificance and HeightNormalizer can be empirically determined. In some configurations, BaseSignificance=0.09 and HeightNormalizer=28.2.

Figure 19:
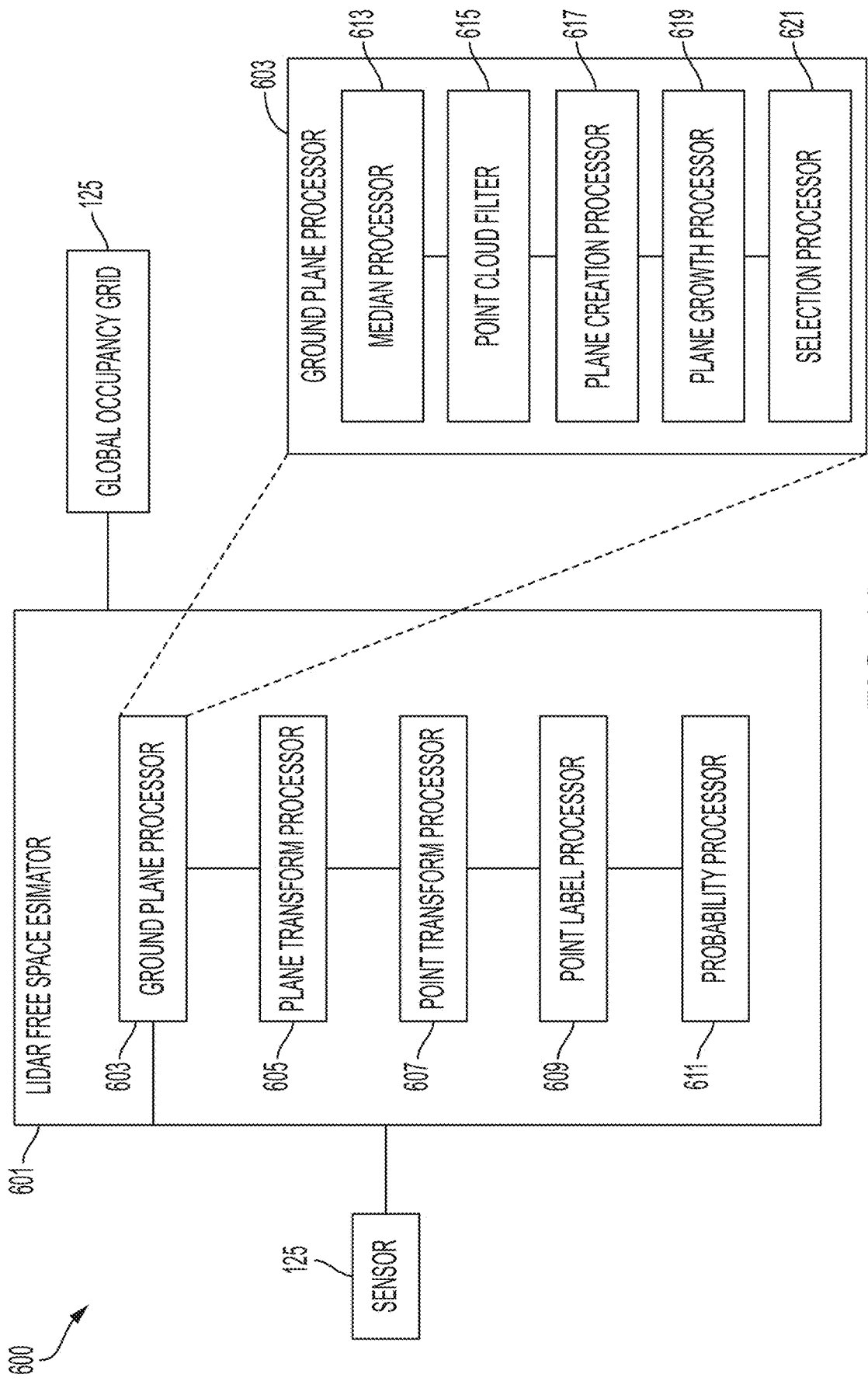
FIG. 19 is a schematic block diagram of a second configuration of the system of the present teachings.

Referring now to FIG. 19, system 600 for determining free space in a navigation path for an autonomous vehicle can include, but is not limited to including, ground plane processor 603 determining ground planes from point cloud data received from a sensor, each of the ground planes being associated with a ground plane equation, the sensor having a sensor frame of reference. System 600 can include plane transform processor 605 transforming the ground plane equation from the sensor frame of reference to a vehicle frame of reference associated with the autonomous vehicle, point transform processor 607 transforming points in the point cloud data from the sensor frame of reference to the vehicle frame of reference, point label processor 609 labeling points in the point cloud data as free space if the transformed points satisfy the transformed ground plane equation, and probability processor 611 providing occupancy grid data to augment an occupancy grid based at least on the labeled points. System 600 can optionally include executable code including computer instructions substituting a default plane when none of the ground planes can be determined, removing the points from the point cloud data if the points exceed a pre-selected distance from the autonomous vehicle, removing the points from the point cloud data if the points exceed a pre-selected height based at least on a vehicle height of the autonomous vehicle, and removing the points from the point cloud data if the points are within a pre-selected distance from the autonomous vehicle.

Continuing to refer to FIG. 19, ground plane processor 603 can optionally include, but is not limited to including, median processor 613 computing a median of at least two rings of the point cloud data, point cloud filter 615 filtering the point cloud data based at least on a distance of the points in the point cloud data from the median, plane creation processor 617 creating planes from the filtered point cloud data, each of the created planes having at least one azimuth angle. Ground plane processor 603 can include plane growth processor 619 growing the created planes from the point cloud data extending away from the autonomous vehicle along the at least one azimuth angle, and selection processor 621 choosing the ground planes from the grown planes based at least on an orientation and residual error of each of the created planes. Plane creation processor 617 can include, but is not limited to including, executable code including computer instructions selecting a first point and a second point from a first ring of sensor data, the first point and the second point lying within boundaries formed by discontinuities in the point cloud data on the first ring, the first point having a first azimuth angle and the second point having a second azimuth angle, selecting a third point from a second ring of sensor data, the second ring being adjacent to the first ring, the third point having a third azimuth angle between the first azimuth angle and the second azimuth angle, and creating one of the planes including the first point, the second point, and the third point.

Continuing to refer to FIG. 19, plane transform processor 605 can optionally include executable code including computer instructions computing a unity vector from coefficients of the ground plane equation, the ground plane equation including ax+by+cz+d=0, the coefficients including a, b, and c, a constant including d, normalizing the d constant, transforming the a, b, c coefficients of the ground plane equation based on a rotation/translation matrix and the unity vector, and transforming the normalized d constant based on the normalized d constant, the rotation/translation matrix, the unity vector, and the transformed a, b, c coefficients. Plane transform processor 605 can optionally include executable code including computer instructions computing a unity vector from coefficients of the ground plane equation, the ground plane equation including ax+by+cz+d=0, the coefficients including a, b, and c, a constant including d according to $$\vec{u} = \left[ \frac{a}{\sqrt[2]{a^2+b^2+c^2}}, \frac{b}{\sqrt[2]{a^2+b^2+c^2}}, \frac{c}{\sqrt[2]{a^2+b^2+c^2}} \right],$$

normalizing the d constant according to $$d_{norm} = \frac{d}{\sqrt[2]{a^2+b^2+c^2}},$$

transforming the a, b, c coefficients of the ground plane equation based on a rotation/translation matrix and the unity vector according to $$\overline{v} = [R \mid t]_{3\times 4} \begin{bmatrix} \tilde{u} \\ 0 \end{bmatrix}_{4\times 1} = \begin{bmatrix} a' \\ b' \\ c' \end{bmatrix}_{3\times 1},$$

and transforming the normalized d constant based on the normalized d constant, the rotation/translation matrix, the unity vector, and the transformed a, b, c coefficients according to $$\tilde{d} = [R \mid t]_{3\times 4} \begin{bmatrix} -d_{norm}*\tilde{u}_x \\ -d_{norm}*\tilde{u}_y \\ -d_{norm}*\tilde{u}_z \end{bmatrix} = \begin{bmatrix} \tilde{d}_x \\ \tilde{d}_y \\ \tilde{d}_z \end{bmatrix}$$

$$a'*\tilde{d}_x + b'*\tilde{d}_y + c'*\tilde{d}_z + d' = 0.$$

Continuing to refer to FIG. 19, point label processor 609 can optionally include executable code including computer instructions plugging each of the transformed point cloud points into the transformed ground plane equations, individually labeling the transformed point cloud points as free space if the transformed point cloud points satisfy the transformed ground plane equation: −threshold ≤a'x+b'y+c'z+d'≤+threshold. Probability processor 611 can optionally include executable code including the computer instructions updating locations on a grid map corresponding to the transformed point cloud points based at least on results from the transformed ground plane equation, and computing a probability that a cell in the occupancy grid includes an obstacle based at least on the grid map. Probability processor 611 can optionally include executable code including the computer instructions updating locations on a grid map corresponding to the transformed point cloud points based at least on results from the transformed ground plane equation, and computing a probability that a cell in the occupancy grid includes an obstacle based at least on the grid map, sensor noise, and a height of the obstacle. Probability processor 611 can optionally include executable code including the computer instructions updating locations on a grid map corresponding to the transformed point cloud points based at least on results from the transformed ground plane equation, and computing a probability that a cell in the occupancy grid includes an obstacle according to $$LogOdds = \log\left(\frac{pMapCell}{1 - pMapCell}\right),$$

where
pMapCell=0.9 when a distance from the autonomous vehicle to the cell falls in a blind spot of the sensor,
pMapCell=0.3 when a line between the cell and the autonomous vehicle includes none of the obstacles,
pMapCell=0.5 for all other cells,
pMapCell=pOccR+noiseFactor when the cell spatially coincident with the autonomous vehicle includes the obstacle,
where pOccR=POnObstacle=0.5,
noiseFactor=((measurementSignificance/(noiseStdDev*Root of 2Pi))+POnObstacle−pOccR)*gausianNoiseExponential,
noiseStdDev=square of z_t*LidarNoise,
gausianNoiseExponential=pow(EXP, (−0.5*pow(((d2Cell−z_t)/noiseStdDev), 2))),
z_t=Euclidean distance to the obstacle from the autonomous vehicle,
d2cell=Euclidean distance to the cell from the autonomous vehicle,
measurementSignificance=BaseSignificance*(HeightNormalizer*Total_Obstacle_Height),
LidarNoise, BaseSignificance, and HeightNormalizer include values based at least on a configuration of the autonomous vehicle and the sensor,
pMapCell=pOccR+noiseFactor when the cell falls spatially before or beyond the autonomous vehicle along the line includes the obstacle,
where pOccR=PMin=0.5,
noiseFactor=((measurementSignificance/(noiseStdDev*Root of 2Pi))+POnObstacle−pOccR)*gausianNoiseExponential
noiseStdDev=square of z_t*LidarNoise
LidarNoise is an empirical constant
gausianNoiseExponential=pow(EXP, (−0.5*pow(((d2Cell−z_t)/noiseStdDev), 2)))
z_t=euclidean distance to the obstacle from the autonomous vehicle,
d2cell=euclidean distance to the cell from the autonomous vehicle,
measurementSignificance=BaseSignificance, LidarNoise, BaseSignificance, and HeightNormalizer include the values, and
pMapCell=1.0 when the cell falls spatially along the line beyond a last of the obstacles or beyond a last of the point cloud data.

BaseSignificance can optionally equal 0.09. HeightNormalizer can optionally equal 28.2.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on different computers. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. Autonomous vehicle comprising a processor configured for:
   receiving the point cloud data from a sensor, the sensor having a sensor beam, the sensor beam projecting at least from the sensor to the surface;
   segmenting the point cloud data into segments of a first pre-selected size;
   locating planes, plane points in the planes, and non-plane points associated with at least one of the plane points within the point cloud data;
   determining normals to the plane points and determining the non-plane points associated with the plane points;
   choosing at least one of the planes as a surface plane according to pre-selected criteria based at least on the normals and a location of the sensor;
   classifying each of the plane points as an obstacle point based at least on the associated non-plane points;
   determining obstacle height associated with the obstacle points based at least on the non-plane points;
   creating a grid from the surface planes, the grid having a pre-selected number of cells and a perimeter;
   computing a measurement significance for each of the cells based at least on the obstacle heights in the cells;
   determining a blind distance from the sensor based at least on an intersection between the sensor beam and the surface plane;
   for each of the cells along each line between the blind distance and the perimeter, computing an initial probability of obstacles occupying the cell along the line, the initial probability being based at least on availability of the sensor, the obstacle points in the cell, and a position of the cell along the line with respect to the sensor;
   for each of the cells along each line between the blind distance and the perimeter, computing a noise factor based at least on a first distance between the sensor and a closest of the obstacles along the line in the cell, a second distance between the sensor and the cell along the line, the measurement significance for the cell along the line, the initial probability for the cell along the line, and a default probability;
   for each of the cells along each line between the blind distance and the perimeter, computing a current probability of the obstacles occupying the cell along the line, the current probability being based at least on the initial probability for the cell and the noise factor for the cell; and
   navigating the vehicle based on the current probability.

2. Autonomous vehicle of claim 1 wherein the first pre-selected size comprises about 40 m×40 m×2 m.

3. Autonomous vehicle of claim 1 wherein the pre-selected criteria comprise choosing the surface plane when the normals of the planes do not face the sensor.

4. Autonomous vehicle of claim 1 wherein the pre-selected number of cells comprises 400×400.

5. Autonomous vehicle of claim 1 wherein computing the initial probability comprises:
   if the sensor is unavailable and the cell is a near cell, the near cell being near the blind distance, the initial probability of the cell=1.0;
   if the sensor is unavailable and the cell is between the near cell and the perimeter, the initial probability of the cell=0.5;
   if the sensor is available and there is at least one of the obstacle points in the cell, or if one of the cells along the line that was previously encountered included at least one of the obstacle points, the initial probability of the cell=0.5; and
   if the sensor is available and there are none of the obstacle points in the cell and none of the cells previously encountered along the line included at least one of the obstacle points, the initial probability of the cell=0.3.

6. Autonomous vehicle of claim 1 wherein computing the noise factor comprises:

$$((\text{measurement significance}/(\sigma\sqrt{2\pi}))+0.5-\text{the initial probability of the cell})*\exp(-0.5*((d-Z_t)/\sigma)^2),$$

wherein
d=the second distance,
$Z_t$=the first distance, and
$\sigma=Z_t^2*0.001$.

7. Autonomous vehicle of claim 1 wherein computing the current probability comprises:
   the noise factor of the cell+the initial probability of the cell.

8. Autonomous vehicle of claim 1 wherein each of the planes comprises the non-plane points up to a first pre-selected distance from the planes.

9. Autonomous vehicle of claim 8 wherein the first pre-selected distance comprises 2 m.

10. Autonomous vehicle traveling on a surface, the system comprising:
    a segment processor receiving the point cloud data from the sensor, the segment processor segmenting the point cloud data into segments of a first pre-selected size;
    a plane processor locating, within the point cloud data, planes, plane points in the planes, and non-plane points associated with at least one of the plane points;
    a normals processor determining normals to the plane points and determining the non-plane points associated with the plane points, the normals processor choosing at least one of the planes as a surface plane according to pre-selected criteria based at least on the normals and a location of the sensor, the normals processor classifying each of the plane points as an obstacle point based at least on the associated non-plane points, the normals processor determining obstacle height associated with the obstacle points based at least on the non-plane points;

a grid processor creating a grid from the surface planes, the grid having a pre-selected number of cells and a perimeter;

a line sweep processor including a measurement significance processor computing a measurement significance for each of the cells based at least on the obstacle heights in the cells, the line sweep processor including an initial probabilities processor determining a blind distance from the sensor based at least on an intersection between the sensor beam and the surface plane, the initial probabilities processor including for each of the cells along each line between the blind distance and the perimeter, computing an initial probability of obstacles occupying the cell along the line, the initial probability being based at least on availability of the sensor, the obstacle points in the cell, and a position of the cell along the line with respect to the sensor;

a noise factor processor including for each of the cells along each line between the blind distance and the perimeter, computing a noise factor based at least on a first distance between the sensor and a closest of the obstacles along the line in the cell, a second distance between the sensor and the cell along the line, the measurement significance for the cell along the line, the initial probability for the cell along the line, and a default probability; and a current probabilities processor including for each of the cells along each line between the blind distance and the perimeter, computing a current probability of the obstacle points occupying the cell along the line, the current probability being based at least on the initial probability for the cell and the noise factor for the cell;

wherein said autonomous vehicle is navigated based on the current probability.

11. System of claim 10 further comprising a sensor having a sensor beam, the sensor beam projecting at least from the sensor to the surface.

12. Autonomous vehicle comprising a processor configured for:

determining at least one surface plane in the sensor data, the at least one surface plane being associated with the surface;

determining obstacles, if any, and heights of the obstacles, if any, in the sensor data associated with the at least one surface plane;

determining a blind distance from the autonomous vehicle based at least on a dimension of the autonomous vehicle;

creating a grid on the at least one surface plane, the grid having a pre-selected number of cells and a perimeter;

for each of the cells along each line on the at least one surface plane between the blind distance and the perimeter, computing an initial probability of the obstacles occupying the cell along the line, the initial probability being based at least on availability of the sensor data, the obstacles in the cell, and a position of the cell along the line with respect to the autonomous vehicle;

for each of the cells along each line between the blind distance and the perimeter, computing a noise factor based at least on a first distance between the autonomous vehicle and a closest of the obstacles along the line in the cell, a second distance between the autonomous vehicle and the cell along the line, the obstacle heights for the cell along the line, the initial probability for the cell along the line, and a default probability; and for each of the cells along each line between the blind distance and the perimeter, computing a current probability of the obstacles occupying the cell along the line, the current probability being based at least on the initial probability for the cell and the noise factor for the cell; and navigating the vehicle based on the current probability.

13. Autonomous vehicle of claim 12 wherein the pre-selected number of cells comprises 400×400.

14. Autonomous vehicle of claim 12 wherein computing the initial probability comprises:

if the sensor data are unavailable and the cell is a near cell, the near cell being near the blind distance, the initial probability of the cell=1.0;

if the sensor data are unavailable and the cell is between the near cell and the perimeter, the initial probability of the cell=0.5;

if the sensor data are available and there is at least one of the obstacles in the cell, or if one of the cells along the line that was previously encountered included at least one of the obstacles, the initial probability of the cell=0.5; and if the sensor data are available and there are none of the obstacles in the cell and none of the cells previously encountered along the line included at least one of obstacles, the initial probability of the cell=0.3.

15. Autonomous vehicle of claim 12 wherein computing the noise factor comprises:

$$((0.09*28.2*\Sigma \text{the obstacle heights in the cell}/(\sigma \sqrt{2\pi}))+0.5-\text{the initial probability of the cell})*\exp(-0.5*((d-Z_t)/\sigma)^2),$$

wherein
d=the second distance,
$Z_t$=the first distance, and
$\sigma=Z_t^2*0.001$.

16. Autonomous vehicle of claim 12 wherein computing the current probability comprises:

the noise factor of the cell+the initial probability of the cell.

17. Autonomous vehicle of claim 12 wherein the at least one surface plane comprises non-plane points up to a first pre-selected distance from the at least one surface plane.

18. Autonomous vehicle of claim 17 wherein the first pre-selected distance comprises 2 m.

19. Autonomous vehicle of claim 17 further comprising:
determining the obstacle heights based at least on the non-plane points.

* * * * *